US012804242B2

(12) United States Patent
Wu et al.

(10) Patent No.: US 12,804,242 B2
(45) Date of Patent: Nov. 17, 2026

(54) METHODS, SYSTEM, AND APPARATUS TO SELECT AMONG IMAGE SENSORS BASED ON DEVICE ORIENTATION

(71) Applicant: Intel Corporation, Santa Clara, CA (US)

(72) Inventors: Airong Wu, Beijing (CN); Jianxin Fan, Beijing (CN); Yilong Zhai, Beijing (CN)

(73) Assignee: Intel Corporation, Santa Clara, CA (US)

( * ) Notice: Subject to any disclaimer, the term of this patent is extended or adjusted under 35 U.S.C. 154(b) by 96 days.

(21) Appl. No.: 18/839,354

(22) PCT Filed: Mar. 16, 2022

(86) PCT No.: PCT/CN2022/081139
§ 371 (c)(1),
(2) Date: Aug. 16, 2024

(87) PCT Pub. No.: WO2023/173315
PCT Pub. Date: Sep. 21, 2023

(65) Prior Publication Data

US 2025/0159343 A1 May 15, 2025

(51) Int. Cl.

| | |
|---|---|
| ***H04N 23/45*** | (2023.01) |
| ***G06F 9/455*** | (2018.01) |
| ***H04N 23/667*** | (2023.01) |

(52) U.S. Cl.
CPC ......... *H04N 23/45* (2023.01); *G06F 9/45558* (2013.01); *H04N 23/667* (2023.01); (Continued)

(58) Field of Classification Search
None
See application file for complete search history.

(56) References Cited

U.S. PATENT DOCUMENTS

| | | | |
|---|---|---|---|
| 5,900,909 A | 5/1999 | Parulski et al. | |
| 2012/0229380 A1 | 9/2012 | Silvester | |

(Continued)

FOREIGN PATENT DOCUMENTS

| | | | |
|---|---|---|---|
| CN | 105530385 A * | 4/2016 | ............ H04N 23/67 |
| CN | 110365896 A | 10/2019 | |

(Continued)

OTHER PUBLICATIONS

International Searching Authority, "International Preliminary Report on Patentability," issued in connection with International Patent Application No. PCT/CN2022/081139, mailed on Sep. 26, 2024, 5 pages.

(Continued)

*Primary Examiner* — Paul M Berardesca
(74) *Attorney, Agent, or Firm* — Hanley, Flight & Zimmerman, LLC

(57) ABSTRACT

Methods, systems, and apparatus are disclosed to select among image sensors based on device orientation. An example electronic device comprising a device orientation sensor, a first image sensor, a second image sensor, and processor circuitry to execute instructions to determine a detected orientation of the electronic device based on data from the device orientation sensor, select one of the first image sensor or the second image sensor based on the detected orientation of the electronic device, the first image sensor associated with a first orientation of the electronic device, the second image sensor associated with a second orientation of the electronic device, and activate the selected one of the first image sensor or the second image sensor to collect image data.

20 Claims, 13 Drawing Sheets

(52) U.S. Cl.
CPC .............. *G06F 2009/45562* (2013.01); *G06F 2009/45575* (2013.01); *G06F 2009/45579* (2013.01)

(56) References Cited

U.S. PATENT DOCUMENTS

| | | | | |
|---|---|---|---|---|
| 2014/0176767 | A1* | 6/2014 | Hamel | H04N 1/19594 348/240.2 |
| 2018/0295292 | A1* | 10/2018 | Lee | H04N 23/62 |
| 2019/0236765 | A1* | 8/2019 | Yeo | G06T 5/70 |
| 2020/0311957 | A1* | 10/2020 | Peterson | H04N 23/45 |
| 2021/0360172 | A1* | 11/2021 | Liu | H04N 5/265 |
| 2022/0201224 | A1* | 6/2022 | Siu | H04N 23/631 |
| 2023/0011755 | A1* | 1/2023 | Choi | H04N 23/951 |
| 2023/0088309 | A1* | 3/2023 | Babon | H04N 23/45 348/222.1 |
| 2024/0007583 | A1* | 1/2024 | Leng | H04N 23/63 |

FOREIGN PATENT DOCUMENTS

| | | | | |
|---|---|---|---|---|
| CN | 111225138 | A | 6/2020 | |
| WO | WO-2022186495 | A1 * | 9/2022 | G03B 30/00 |

OTHER PUBLICATIONS

International Searching Authority, "Written Opinion of the International Searching Authority," issued in connection with International Patent Application No. PCT/CN2022/081139, mailed on May 31, 2022, 3 pages.

International Searching Authority, "International Search Report," issued in connection with International Patent Application No. PCT/CN2022/081139, mailed on May 31, 2022, 3 pages.

* cited by examiner

METHODS, SYSTEM, AND APPARATUS TO SELECT AMONG IMAGE SENSORS BASED ON DEVICE ORIENTATION

FIELD OF THE DISCLOSURE

This disclosure relates generally to electronic devices and, more particularly, to methods, systems, and apparatus to select among image sensors based on device orientation.

BACKGROUND

Many electronic devices today include a front-facing camera, also referred to as a user-facing camera. The front-facing camera includes an image sensor to collect image data and an image processor to process the image data. A user may utilize the electronic device having the front-facing camera during a video event, such as a video conference. The front-facing camera allows the user to interact with the electronic device while the video event is presented by the electronic device.

Figure 1:
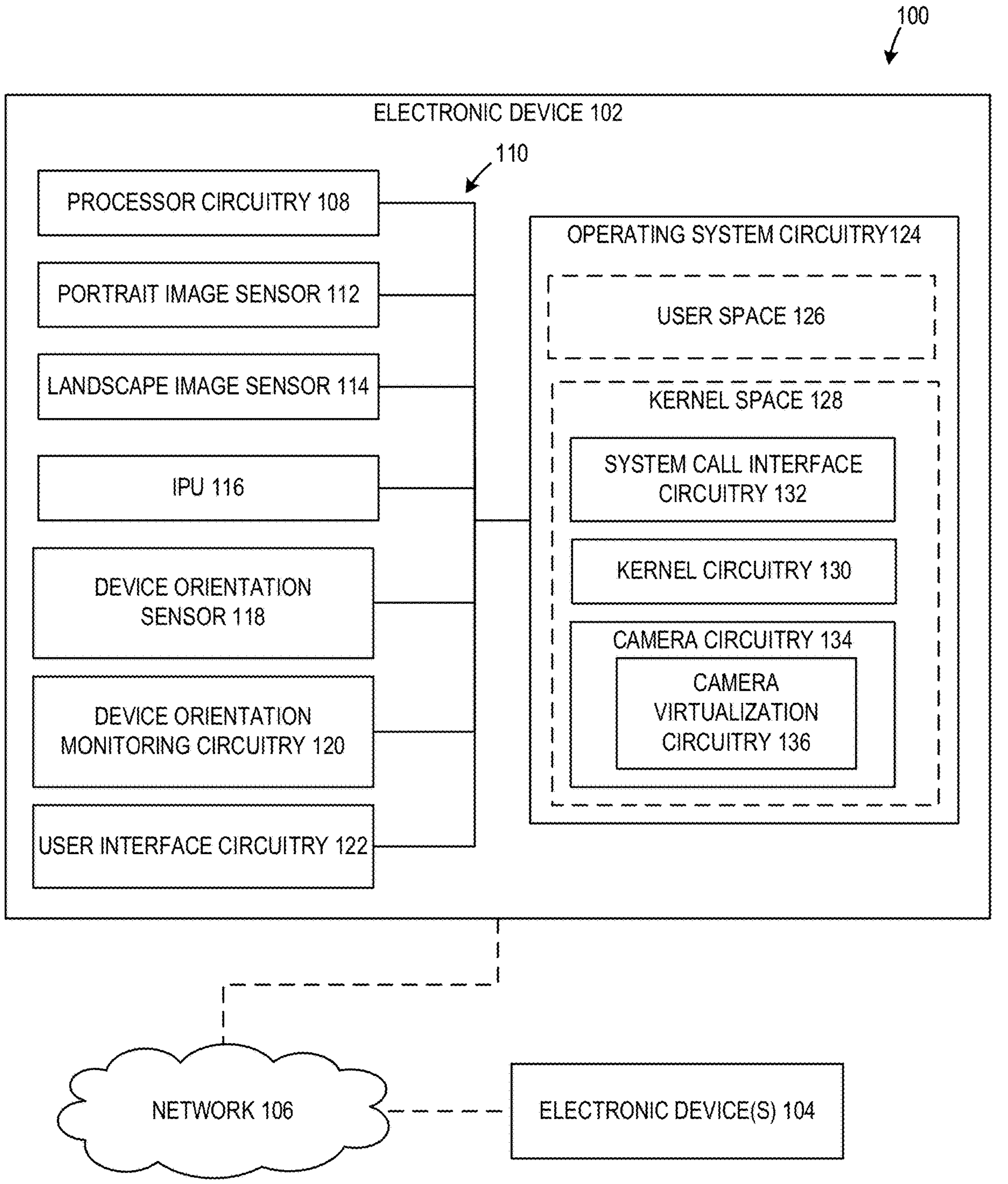
FIG. 1 is a block diagram of an example system including an electronic device constructed in accordance with the teachings of this disclosure to select among image sensors based on device orientation.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein "positioned substantially" refers to a relationship between a position of an image sensor and a housing of an electronic device. For example, an image sensor that is "positioned substantially in a middle" of an edge of a housing of the electronic device means the image sensor is within 10% of a middle of the edge of the housing of the electronic device. Similarly, an image sensor that is "positioned substantially near a horizontal edge" of a housing of the electronic device means the image sensor is within 10% of the horizontal edge of the housing of the electronic device.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

In recent years, front-facing camera usage has become increasingly common. A front-facing (e.g., user-facing) camera is a camera built into an electronic device that is positioned on a same side as a display screen of the electronic device. The front-facing camera includes a front-facing image sensor to capture image data and an image processor to process the captured image data. Thus, the front-facing camera captures image(s) data of a user and/or an environment surrounding the camera for later display on the electronic device and/or other devices in communication with the electronic device.

The front-facing camera may be used for any number of activities, such as video conferencing, video streaming, photography, etc. Video conferencing and streaming have become commonplace activities in today's world. For example, the education industry utilizes video conferencing to host classes, meetings between students and/or faculty, extra-curricular activities, and/or other educational objectives. Individuals often stream videos of themselves and/or their environment to provide content to followers on social media applications. For many people, utilizing the front-facing camera is an important part of everyday life.

The electronic device typically includes two main orientations: a portrait (e.g., vertical) orientation and a landscape (e.g., horizontal) orientation. In the portrait orientation, the electronic device is positioned (e.g., rotated) such that the display screen of the electronic device is taller than it is wider. In the landscape orientation, the electronic device is positioned (e.g., rotated) such that the display screen of the electronic device is wider than it is taller. Typically, the electronic device includes one front-facing camera positioned to support the portrait orientation of the electronic device. For example, most cell-phones, tablets, and laptops include one front-facing camera positioned at a top edge of a front of the device in the portrait orientation, near a middle of the device. However, many applications that utilize the front-facing camera are tailored for use in the landscape orientation. Because most electronic devices do not include a front-facing camera positioned to support the landscape orientation of the device, the user must utilize the front-facing camera on the portrait orientation in such circumstances. As a result, the user's facial features (e.g., face, eyes, etc.) may appear distorted in a displayed image of the user. Accordingly, the electronic device that includes the front-facing camera only in the portrait orientation may not support a good field-of-view (FOV) in the landscape orientation and/or other orientations.

Some electronic devices today are configured to allow a user to add a camera to the electronic device. For example, the user may add an external webcam to the electronic device (e.g., via a wired and/or wireless connection). In such examples, each camera operates independently with a separate driver. Such a configuration is not ideal for video events, such as a video conference, and may result in complications. For example, the user and/or an application of a device that supports both the front-facing camera and an external camera may be required select which camera to use to capture image data upon launching of the application. Similarly, a change in orientation of the electronic device may call for the user to manually switch between the multiple cameras. The user may find the task of choosing and/or switching between two or more front-facing cameras confusing and/or inconvenient. For example, the user may not know how to operate the application to make such a switch.

Some applications may now allow the user to select which front-facing camera from which to capture image data. In some examples, the application does not provide a camera selection and/or switch function. For example, the application may select the first front-facing camera found on the electronic device and may not recognize other cameras on the electronic device.

For many electronic devices today, the user and/or the application may not be able select a front-facing camera with a good FOV. Furthermore, requiring the user and/or the application to determine which front-facing camera to utilize results in a latency, especially when switching between cameras. In some examples, the latency is approximately 500 milli-seconds (ms). Accordingly, there is a need for an electronic device that supports a good quality FOV in the portrait orientation and in the landscape orientation, and which selects the front-facing camera that provides the good quality FOV automatically and with little to no latency.

Disclosed herein are example electronic devices having two or more front-facing image sensors that dynamically select the image sensor that provides a best or otherwise good quality FOV, with little to no latency. For example, the electronic device (e.g. device, etc.) employs the image sensor during operation of a camera running on the electronic device for performing an image capture task, such as a video conference. The camera includes the image sensor and an image processor. Before employing the image sensor, examples disclosed herein select the front-facing image sensor that will provide the best or otherwise good quality FOV. In some examples, the electronic device selects the front-facing image sensor based on an orientation (e.g., rotation position) of the electronic device. For example, the electronic device may determine an orientation of the electronic device and/or an orientation of the electronic device required by a specific application and select the front-facing image sensor corresponding to (e.g., associated with) the determined orientation. In some examples, the electronic device includes a first front-facing image sensor positioned to support the portrait orientation (e.g., a portrait image sensor) of the device and a second front-facing image sensor positioned to support the landscape orientation (e.g., a landscape image sensor) of the device. In some such examples, electronic devices disclosed herein employ the portrait image sensor when the electronic device is in a portrait orientation and employ the landscape image sensor when the electronic device is in the landscape orientation.

Example electronic devices disclosed herein dynamically determine which front-facing image sensor to employ for image capture for a specific scenario. In some examples, the example electronic device selects among the multiple front-facing image sensors in response to a request to launch an application. For the sake of simplicity, applications discussed herein are assumed to utilize a front-facing camera. However, it is understood that example electronic devices disclosed herein can execute other applications which may not utilize the front-facing camera. In some examples, the example electronic device selects among the multiple front-facing image sensors in response to a change in orientation of the electronic device. That is, example electronic devices disclosed herein may switch the image sensor that is employed (e.g., for streaming) during operation of the camera. As such, example electronic devices disclosed herein enable a user and/or an application to utilize a particular front-facing image sensor to capture image data having the best or otherwise good-quality FOV in any orientation.

Disclosed example electronic devices select and manage the front-facing image sensors in a manner that is transparent to other components of the electronic device, such as upper layers of an operating system (OS) of the electronic device, an application running on the electronic device, and/or a user of the electronic device. Example electronic devices disclosed herein encapsulate the two or more front-facing image sensors into an example virtual sensor device. In doing so, the two or more front-facing image sensors are virtualized (e.g., abstracted) into one logical camera device. In examples electronic devices disclosed herein, the image sensors are controlled by the virtual sensor device. Example electronic devices disclosed herein expose the example virtual sensor device to an operating system (OS) of the electronic device and/or an application running on the electronic device. The actual front-facing image sensors are hidden from the upper layers of the OS and the application(s) that execute on the electronic device. As such, the OS and/or application(s) are unaware that the electronic device includes two or more front-facing image sensors, and need not be modified to take advantage of the availability of two or more front-facing image sensors.

In some examples disclosed herein, the two or more front-facing image sensors are powered on in response to an application launching that utilizes a front-facing camera. The image sensors are placed into a software standby mode until entered into a streaming mode or powered down. Example electronic devices disclosed herein ascertain a current orientation of the electronic device to determine which front-facing image sensor will provide the best or otherwise good-quality FOV. The selected image sensor is placed into a streaming mode and used to capture image data while the other image sensor(s) remains in standby mode. By keeping the non-streaming image sensor(s) in standby mode, which has a relatively low power consumption (e.g., compared to streaming mode), the other image sensor(s) is (are) ready to begin capturing image data on the fly. Upon a change in orientation of the electronic device, a new device orientation is determined and a new image sensor is selected to be active. The switch occurs within the virtual sensor device, which places the formerly streaming sensor into standby mode and places the newly selected image sensor (e.g., selected based on a new orientation) into streaming mode to capture image data.

Example electronic devices disclosed herein include multiple front-facing image sensors positioned to support different orientations. The example electronic devices select the image sensor that will capture the best or otherwise good-quality image data automatically, with little to no latency, and with little to no increase in power consumption. Example electronic devices disclosed herein include an image processor structured to process image data from the front-facing image sensors (e.g., in real-time). Examples disclosed herein thus allow a user and/or an application to continually utilize a front-facing camera that provides the best or otherwise good-quality FOV of the user and/or the user's environment in any orientation and without action by the user. As such, examples disclosed herein may improve a user experience during an image and/or video event, such as a video conference or while capturing an image.

FIG. 1 is a block diagram of an example system 100 including an example electronic device 102 structured in accordance with the teachings of this disclosure to select among image sensors based on device orientation. The system 100 may be used for image capture tasks such as video conferencing, video streaming, capturing images, creating image content, etc. The system 100 includes the example electronic device 102, which may implement any suitable electronic device, such as a personal computer (PC) device (e.g., desktop, laptop, an electronic tablet, etc.), a gaming system, a smartphone, etc. In the illustrated example system 100, the electronic device 102 may be in communication with one or more other electronic device(s) 104 via an example network 106. For example, the electronic device 102 may be in communication with additional electronic devices 104 during a video conference.

The example network 106 may be implemented using any network over which data can be transferred, such as the Internet. The example network 106 may be implemented using any suitable wired and/or wireless network(s) including, for example, one or more data buses, one or more Local Area Networks (LANs), one or more wireless LANs, one or more cellular networks, one or more private networks, one or more public networks, among others. In additional or alternative examples, the network 106 is an enterprise network (e.g., within businesses, corporations, etc.), a home network, among others.

The example electronic device 102 includes example processor circuitry 108, which is structured to execute machine readable instructions (e.g., software) including, for example, user applications, an operating system, etc. The example processor circuitry 108 is a semiconductor-based hardware logic device. The processor circuitry 108 may implement a central processing unit (CPU) of the electronic device 102, may include any number of cores, and may be implemented, for example, by commercially available processing circuitry. In some examples, the processor circuitry 108 is communicatively coupled to additional processing circuitry. The electronic device 102 includes an example bus 110, which is structured to communicatively couple components of the electronic device 102.

The example electronic device 102 includes two or more front-facing image sensors. In the illustrated example of FIG. 1, the electronic device 102 includes an example first image sensor 112 positioned to support a portrait orientation (e.g., a portrait image sensor) and an example second image sensor 114 positioned to support a landscape orientation (e.g., a landscape image sensor). The portrait image sensor 112 is positioned substantially in a vicinity of (e.g., proximate) a horizontal (e.g., top) edge of the electronic device 102 in the portrait orientation. The landscape image sensor 114 is positioned substantially in a vicinity of (e.g., proximate) a horizontal (e.g., top) edge of the electronic device 102 in the landscape orientation. The image sensors 112, 114 are front-facing and are thus positioned on a side of the electronic device 102 on which a display screen is positioned. The image sensors 112, 114 of FIG. 1 are configured to be associated with their respective orientations. In the illustrated example of FIG. 1, the portrait image sensor 112 is configured to be associated with the portrait orientation while the landscape image sensor 114 is configured to be associated with the landscape orientation. The associations may be configured via registers (e.g., configuration registers), memory locations, configuration bits, etc. of the electronic device 102. Further, the configured associations may be initialized during manufacture, from boot memory, via user configuration information, etc.

The image sensors 112, 114 are structured to capture image data of an environment surrounding the electronic device 102. In some examples, the image sensor 112, 114 is used by a user during a video conference to stream video data of the user and/or the user's environment to other video conference participants. While the electronic device 102 of FIG. 1 includes two front-facing image sensors 112, 114, it is understood that the electronic device 102 may include more than two front-facing image sensors in additional or alternative examples. For example, the electronic device 102 may include four front-facing image sensors, with one on each side of the electronic device 102.

The example electronic device 102 includes an example image processing unit (IPU) 116 (e.g., image process system, image signal processor image processor, etc.). As noted above, the image sensors 112, 114 are structured to capture an image(s) (e.g., a still image and/or video) of an environment adjacent the electronic device 102. Generally, a video is a sequence of images (also referred to as frames) that is captured. The IPU 116 is structured to process image data captured by the image sensor(s) 112, 114. The IPU 116 manages a flow of image frames from the image sensor 112, 114 to a display device (e.g., a display device of the electronic device 102 and/or any other display device in communication with the electronic device 102). In operation, the IPU 116 receives an image (e.g., image data) as an input, processes the image, and outputs a processed image. Image processes may include noise reduction, lens correction, gamma correction, scaling, autofocus, auto exposure, image sharpening, compression, etc.

The example electronic device 102 includes an example device orientation sensor 118, which is structured to measure an orientation of the electronic device 102. The device orientation sensor 118 may be any suitable sensor to measure an orientation of a device, such as an accelerometer, a gyroscope, a magnetometer, etc. Data generated by the device orientation sensor 118 can be used by the electronic device 102 to determine which image sensor 112, 114 will provide a best or otherwise good quality FOV (e.g., based on the device orientation).

The example electronic device 102 includes example orientation monitoring circuitry 120, which is structured to monitor data generated by the device orientation sensor 118 to determine (e.g., detect, identify, etc.) an orientation of the electronic device 102 (e.g., in real time). That is, the orientation of the electronic device 102 is determined based on data from the device orientation sensor 118. The orientation monitoring circuitry 120 also monitors the device orientation sensor 118 to detect a change in orientation of the electronic device 102 while the electronic device 102 is powered on. In some examples, the orientation monitoring circuitry 120 is structured to notify another component of the electronic device 102 of the change in orientation and/or the new orientation of the electronic device 102 (e.g., such as example camera circuitry 134, as discussed below).

The example electronic device 102 includes example user interface circuitry 122, which is structured to enable a user to interact with the electronic device 102. The user interface circuitry 122 obtains information from the user via an input device such as a touchscreen, a mouse, a keyboard, and/or any other type(s) of input device. For example, the user may select an application to be launched, open a camera, etc. via the input device. The user interface circuitry 122 also provides information to the user via an output device, such as a display screen. For example, the user may be able to view image data capture by the image sensor 112, 114 and processed by the IPU 116 via the output device.

The example electronic device 102 also includes example operating system (OS) circuitry 124, which is structured to facilitate communication between an application that executes on the electronic device 102 and hardware components of the electronic device 102. The OS circuitry 124 refers to an operating system of the electronic device 102. The OS circuitry 124 may implement or otherwise correspond to any suitable operating system, such as Microsoft® Windows®, Linux®, etc. The OS circuitry 124 includes an example user space 126 and an example kernel space 128. The user space 126 refers to a portion of the OS circuitry 124 allocated to running (e.g., executing) applications. That is, the user space 126 refers to code executing in the OS circuitry 124 which is stored outside of the example kernel space 128.

The kernel space 128 refers to a separate portion of the OS circuitry 124 that is not accessible by user applications. The kernel space 128 includes example kernel circuitry 130 and example system call interface circuitry 132. The example kernel circuitry 130 is structured to provide an interface between hardware components of the electronic device 102 and a process that executes on the electronic device 102. The example kernel circuitry 130 implements a kernel of the OS. The kernel, which exists within the OS, controls functions of hardware components within the electronic device 102.

The example system call interface circuitry 132 is structured to provide an interface between a program, such as an application, and the kernel circuitry 130 of the OS circuitry 124. The system call interface circuitry 132 implements a system call interface of the OS. The system call interface provides an interface between a process (e.g., executing an application) and the kernel.

The kernel circuitry 130 can access various computer resources such as processor circuitry 108, input and/or output devices (e.g., display screen, image sensors 112, 114, device orientation sensor 118, etc.), and/or other components of the electronic device 102 (e.g., IPU 116). In other words, the kernel circuitry 130 is structured to act as a bridge between the user and resources of the electronic device 102. For example, the user may select an application to be launched via the user interface circuitry 122. In response, the application makes a request (e.g., system call) to the kernel circuitry 130 via the example system call interface circuitry 132 to render the application. The kernel circuitry 130 may then communicate with the processor circuitry 108 and/or other components of the electronic device 102 to cause the application to be rendered.

Within the kernel space 128 of the electronic device 102 resides example camera circuitry 134, which is structured to facilitate communication between the image sensor 112, 114 and upper layers of the OS circuitry 124. In some examples, the camera circuitry 134 implements a camera controller. The camera circuitry 134 includes example camera virtualization circuitry 136, which is structured to manage the image sensors 112, 114. The image sensors 112, 114 are encapsulated by a virtual sensor device that is configured by the camera virtualization circuitry 136 and exposed (e.g., visible) to the OS circuitry 124 and applications that execute on the electronic device 102. In doing so, the image sensors 112, 114 are hidden from the upper layers of the OS circuitry 124 and the applications that execute on the electronic device 102. In other words, the other layers of the OS circuitry 124 and the applications remain agnostic to the electronic device 102 including two or more front-facing image sensors 112, 114. In some examples, the camera virtualization circuitry 136 implements a virtual sensor driver.

During launching of an application, the camera circuitry 134 is structured to power on the image sensors 112, 114, retrieve a current orientation of the electronic device 102 from the orientation monitoring circuitry 120, and select which image sensor 112, 114 to enter into active mode (e.g., streaming mode, capture mode, etc.) based on the current orientation. The camera circuitry 134 places the selected image sensor 112, 114 into active mode and puts the other image sensor(s) 112, 114 into a standby mode (e.g., a software standby mode, a hardware standby mode, a low power mode, etc.). By placing the other image sensor(s) 112, 114 into standby mode rather than deactivating (e.g., turning off, powering down, etc.) them, the other, unselected image sensor(s) 112, 114 can later be selected and placed into streaming with little or no latency. Further, placing the other image sensor(s) 112, 114 into standby mode lowers power consumption as compared to remaining fully powered on.

During operation, the camera control circuitry 304 is structured to respond to a change in orientation. In some examples, the camera control circuitry 304 monitors the device orientation sensor 118 and/or the orientation monitoring circuitry 120 to detect the change in orientation. In some examples, the orientation monitoring circuitry 120 is structured to notify the camera circuitry 134 if the electronic device 102 changes orientation. In some such examples, the camera control circuitry 304 awaits a notification of a change in orientation received by the orientation monitoring circuitry 120. In response to a change in orientation, the camera circuitry 134 enters the currently streaming image sensor 112, 114 into standby mode while entering a newly selected image sensor 112, 114 that corresponds to the new orientation into streaming mode. A latency due to such a switch (e.g., between standby mode and streaming mode) can be negligible (e.g., on the order of milliseconds or lower). As such, the switch is not noticeable to viewers of the image stream.

Figure 2A:
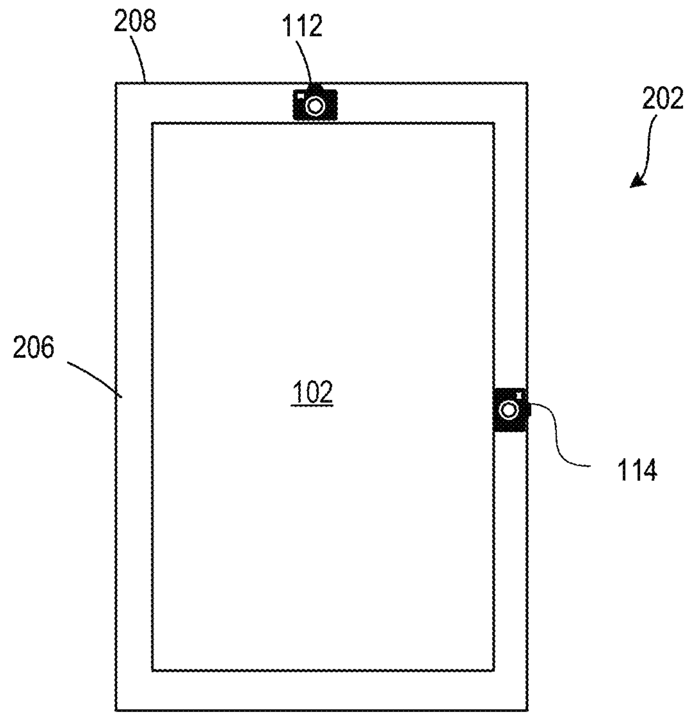
FIG. 2A is a schematic illustration of the example electronic device of FIG. 1 positioned in a portrait orientation.
Figure 2B:
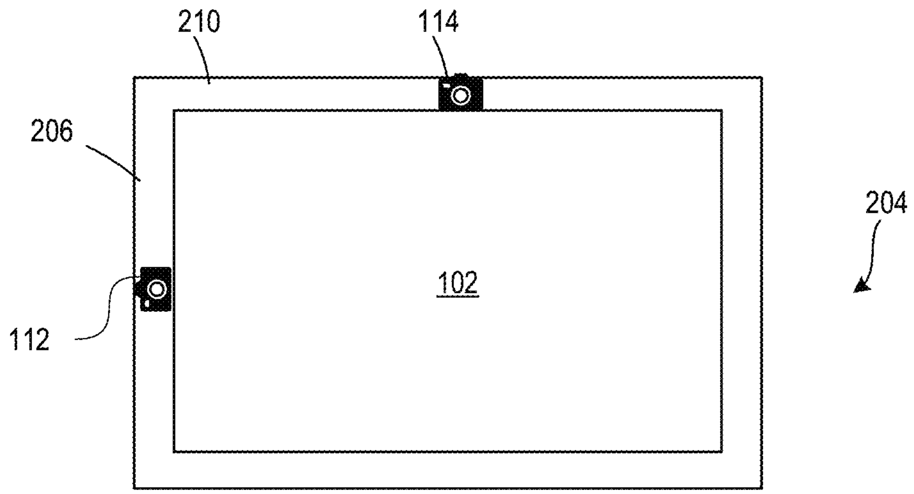
FIG. 2B is a schematic illustration of the example electronic device of FIG. 1 positioned in a landscape orientation.

FIGS. 2A and 2B are schematic illustrations of the example electronic device 102 of FIG. 1 in an example portrait orientation 202 and in an example landscape orientation 204, respectively. FIGS. 2A and 2B illustrate an example housing 206 of the electronic device 102, which encloses components of the electronic device 102. For example, the housing 206 encloses a display screen, the portrait image sensor 112, and the landscape image sensor 114. As illustrated, the housing 206 (and the electronic device 102) is taller than it is wider in the portrait orientation 202. Likewise, the housing 206 is wider than it is taller in the landscape orientation 204.

In the illustrated example of FIG. 2A, the portrait image sensor 112 is positioned substantially at an edge 208 of the electronic device 102 that is associated with a horizontal edge of the device 102 when the device 102 is in the portrait orientation 202. In the portrait orientation 202, the edge 208 is considered to be a top edge 208 of the device 102, and the portrait image sensor 112 is positioned substantially in a middle of the top edge 208 of the housing 206 of the electronic device 102. When the electronic device 102 is in the portrait orientation 202, the portrait image sensor 112 is presumed to provide a best or otherwise good quality FOV. For example, the camera circuitry 134 presumes that the portrait image sensor 112 provides a better FOV than the landscape image sensor 114, which is positioned to a side of the electronic device 102, when in the portrait orientation 202.

In the illustrated example of FIG. 2B, the landscape image sensor 114 is positioned substantially at an edge 210 of the electronic device 102 that is associated with a horizontal edge of the device 102 when the device 102 is in the landscape orientation 204. In the landscape orientation 204, the edge 210 is considered to be a top edge 210 of the device 102, and the landscape image sensor 114 is positioned substantially in a middle of the top edge 210 of the housing 206 of the electronic device 102. When the electronic device 102 is in the landscape orientation 204, the landscape image sensor 114 is presumed to provide the best or otherwise good-quality FOV.

Figure 3:
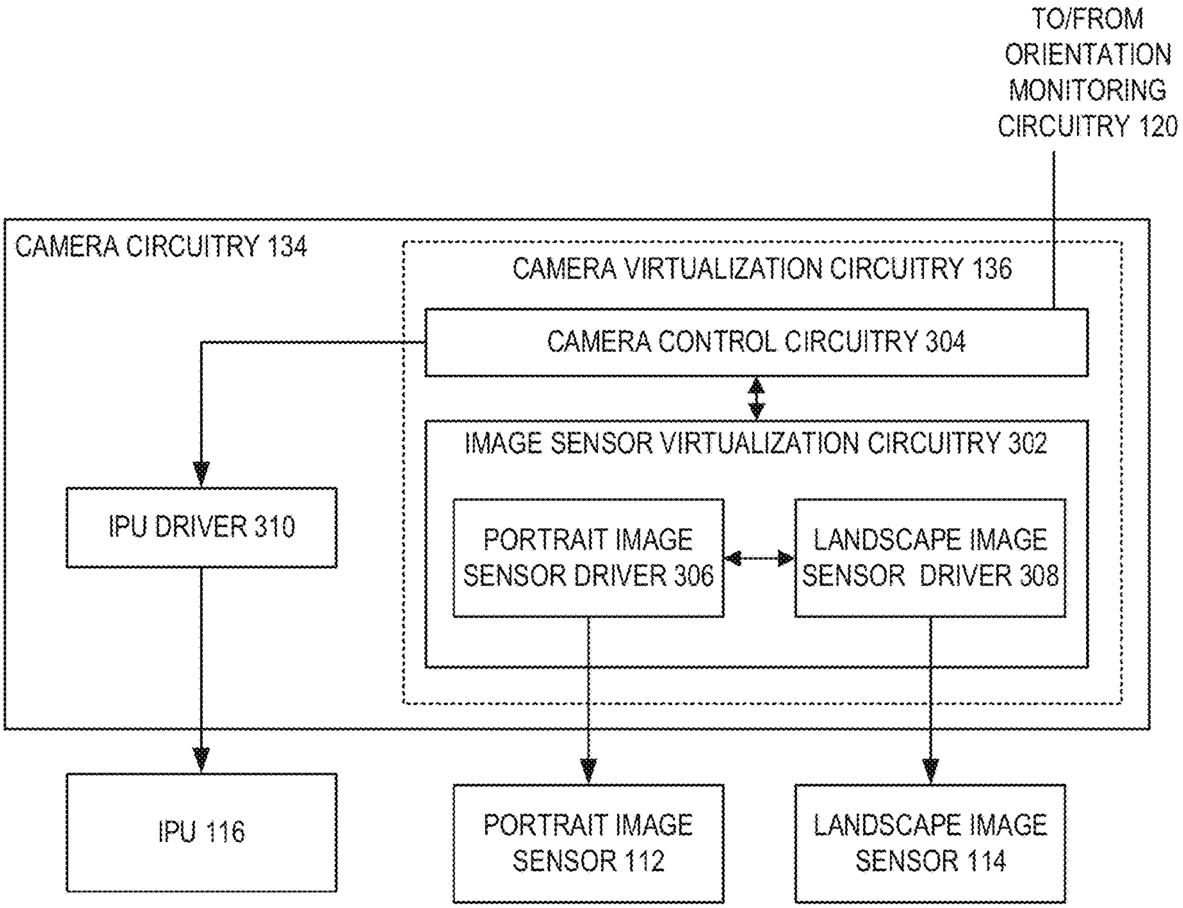
FIG. 3 is a block diagram of the example camera circuitry of FIG. 1, including example camera virtualization circuitry, structured in accordance with the teachings of this disclosure.

FIG. 3 is a block diagram of the example camera circuitry 134 of FIG. 1, including the example camera virtualization circuitry 136, constructed to manage two or more front-facing image sensors (e.g., image sensors 112, 114). The camera circuitry 134 of FIG. 3 may be instantiated (e.g., creating an instance of, bring into being for any length of time, materialize, implement, etc.) by processor circuitry such as a central processing unit executing instructions. Additionally or alternatively, the camera circuitry 134 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

The example camera virtualization circuitry 136 is structured to encapsulate and control the image sensors 112, 114 in a manner that is transparent to other components and/or layers of the electronic device 102. The camera virtualization circuitry 136 includes example image sensor virtualization circuitry 302 and example camera control circuitry 304. The image sensor virtualization circuitry 302 is structured to control the physical image sensors 112, 114 of the electronic device 102 such that they appear to the applications and/or the user as a single, logical image sensor. That is, the image sensor virtualization circuitry 302 is constructed to function as a virtual sensor device (e.g., a logical camera device, virtual camera device, abstract camera device, etc.). In some examples, the image sensor virtualization circuitry 302 registers as an encapsulated camera sensor to the OS circuitry 124.

To control the image sensors 112, 114, the image sensor virtualization circuitry 302 includes an example portrait image sensor driver 306, which is communicatively coupled to the portrait image sensor 112, and an example landscape image sensor driver 308, which is communicatively coupled to the landscape image sensor 114. The image sensor drivers 306, 308 are structured to instruct and control the respective image sensors 112, 114. In operation, the image sensor virtualization circuitry 302 instructs the respective image sensor drivers 306, 308 to power on the image sensors 112, 114, place the image sensors 112, 114 into streaming and/or standby mode, power down the image sensors 112, 114, etc. The image sensor virtualization circuitry 302 performs such tasks in response to instructions from the camera control circuitry 304.

The example camera control circuitry 304 is structured to configure and instruct the example image sensor virtualization circuitry 302. In the illustrated example, when the electronic device 102 is powered on, the OS circuitry 124 loads the image sensor drivers 306, 308. Upon detection of the image sensor drivers 306, 308, the camera control circuitry 304 configures the image sensor virtualization circuitry 302 by adding the image sensor drivers 306, 308 to the image sensor virtualization circuitry 302. The camera control circuitry 304 exposes the configured image sensor virtualization circuitry 302 to the OS circuitry 124, which is then exposed to applications that will execute on the electronic device 102. From a perspective of upper layers of the OS circuitry 124 and/or an application, only the image sensor virtualization circuitry 302 is visible. The actual image sensors 112, 114 are hidden from other components of the OS circuitry 124 and applications that execute on the electronic device 102.

The camera control circuitry 304 is also structured to interface between the image sensor virtualization circuitry 302 and other components of the electronic device 102, such as the OS circuitry 124 and/or applications that execute on the electronic device 102. For example, the kernel circuitry 130 may receive a request to launch an application via the system call interface circuitry 132. If the application includes the use of a camera, the kernel circuitry 130 will instruct the camera circuitry 134 to stream image data (e.g., upon launching of the application). In such an example, the camera control circuitry 304 instructs the image sensor virtualization circuitry 302 to power on the image sensors 112, 114. In some examples, the image sensor virtualization circuitry 302 also places the image sensors 112, 114 into standby mode. The camera control circuitry 304 then identifies (e.g., detects) a current orientation of the electronic device 102 via the orientation monitoring circuitry 120. Based on the current orientation of the electronic device 102, the camera control circuitry 304 selects the image sensor 112, 114 associated with the identified orientation and notifies the image sensor virtualization circuitry 302 of the selection. The image sensor virtualization circuitry 302 then activates the selected image sensor 112, 114 (e.g., by placing the selected image sensor 112, 114 into streaming mode). The other image sensor(s) 112, 114 remains in standby mode, ready to stream in case of an orientation change.

In the event of the orientation change, the orientation monitoring circuitry 120 detects the orientation change and notifies the camera control circuitry 304. In the illustrated example of FIG. 3, the notification includes the new orientation of the electronic device 102. In additional or alternative examples, the camera control circuitry 304 requests the orientation information from the orientation monitoring circuitry 120 and/or the device orientation sensor 118. The camera control circuitry 304 selects the image sensor 112, 114 associated with the new device and instructs the image sensor virtualization circuitry 302 to employ the newly select image sensors 112, 114. To employ the newly selected image sensor 112, 114, the image sensor virtualization circuitry 302 activates the newly selected image sensor 112, 114 (e.g., by placing the newly selected image sensor 112, 114 into streaming mode) and deactivates the previously activated image sensor 112, 114 (e.g., by placing the previously activated image sensor 112, 114 into standby mode).

In some scenarios, a switch in orientation will cause a switch of image sensor that is to be activated (e.g., placed in streaming mode). Such a switch of the image sensor 112, 114 occurs within the image sensor virtualization circuitry 302. To facilitate a seamless switch to a different streaming sensor, the image sensor virtualization circuitry 302 obtains a current configuration of the current streaming image sensor 112, 114 via the corresponding image sensor driver 306, 308. The configuration may include, for example, an exposure, analog gain, digital gain parameters, etc. The image sensor virtualization circuitry 302 configures the newly selected image sensor 112, 114 based on the configuration of the current streaming image sensor 112, 114. Once the newly selected image sensor 112, 114 is configured, the image sensor virtualization circuitry 302 places the current streaming image sensor 112, 114 into standby mode and enters the newly selected image sensor 112, 114 into streaming mode. In some examples, the image sensor virtualization circuitry 302 places the current streaming image sensor 112, 114 into standby mode before placing the newly selected image sensor 112, 114 into streaming mode. In some examples, the image sensor virtualization circuitry 302 places the current streaming image sensor 112, 114 into standby mode after placing the newly selected image sensor 112, 114 into streaming mode. In some examples, the switch in done concurrently.

The example camera circuitry 134 also includes an example IPU driver 310, which is structured to control and instruct the IPU 116 to perform a function (e.g., a process). The example IPU driver 310 is structured to treat the image sensor virtualization circuitry 302 as the virtual sensor device. That is, the IPU driver 310 is structured to receive image data regardless of which image sensor 112, 114 is generating the image data. In the illustrated example of FIG. 3, the camera control circuitry 304 directs image data incoming from the streaming image sensor 112, 114 to the IPU driver 310, which directs the IPU 116 to process the image data. In operation, there may be moments in which multiple image sensors 112, 114 simultaneously capture image data for processing, such as during a transition period when a streaming image sensor 112, 114 is placed into standby mode and a newly selected image sensor 112, 114 is placed in active mode. During these moments, the IPU driver 310 may be receiving image data from two image sensors 112, 114 (e.g., during the switch). In some examples, a buffer may be used during such moments to control the switch between the image data directed to the IPU 116. For example, the camera control circuitry 304 may include separate buffers that are written to be each of the sensors 112, 114, and can switch which buffer is to provide data to the IPU 116. Thus, even if there is a transitional period where the image sensors 112, 114 are both writing data to their respective buffers, only one of those buffers will be provided to the IPU 116.

In some examples, the camera circuitry 134 includes means for collecting image data. For example, the means for collecting image data may be implemented by portrait image sensor driver 306 and/or landscape image sensor driver 308. In some examples, the portrait image sensor driver 306 and/or the landscape image sensor driver 308 may be instantiated by processor circuitry such as the example processor circuitry 1012 of FIG. 10. For instance, the portrait image sensor driver 306 and/or the landscape image sensor driver 308 may be instantiated by the example general purpose processor circuitry 1100 of FIG. 11 executing machine executable instructions such as that implemented by at least block 814 of FIG. 8. In some examples, the portrait image sensor driver 306 and/or the landscape image sensor driver 308 may be instantiated by hardware logic circuitry, which may be implemented by an ASIC or the FPGA circuitry 1200 of FIG. 12 structured to perform operations corresponding to the machine readable instructions. Additionally or alternatively, the portrait image sensor driver 306 and/or the landscape image sensor driver 308 may be instantiated by any other combination of hardware, software, and/or firmware. For example, the portrait image sensor driver 306 and/or the landscape image sensor driver 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the camera virtualization circuitry 136 includes means for abstracting two or more front-facing image sensors into a virtual sensor device. For example, the means for abstracting may be implemented by image sensor virtualization circuitry 302. In some examples, the image sensor virtualization circuitry 302 may be instantiated by processor circuitry such as the example processor circuitry 1012 of FIG. 10. For instance, the image sensor virtualization circuitry 302 may be instantiated by the example general purpose processor circuitry 1100 of FIG. 11 executing machine executable instructions such as that implemented by at least blocks 806, 812, 824 of FIG. 8 and 904-908 of FIG. 9. In some examples, the image sensor virtualization circuitry 302 may be instantiated by hardware logic circuitry, which may be implemented by an ASIC or the FPGA circuitry 1200 of FIG. 12 structured to perform operations corresponding to the machine readable instructions. Additionally or alternatively, the image sensor virtualization circuitry 302 may be instantiated by any other combination of hardware, software, and/or firmware. For example, the image sensor virtualization circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the camera virtualization circuitry 136 includes means for managing a virtual sensor device (e.g., image sensor virtualization circuitry 302). For example, the means for managing may be implemented by example camera control circuitry 304. In some examples, the camera control circuitry 304 may be instantiated by processor circuitry such as the example processor circuitry 1012 of FIG. 10. For instance, the camera control circuitry 304 may be instantiated by the example general purpose processor circuitry 1100 of FIG. 11 executing machine executable instructions such as that implemented by at least blocks 702-706 of FIG. 7, 804, 810, 818 of FIG. 8, and 902 of FIG. 9. In some examples, the camera control circuitry 304 may be instantiated by hardware logic circuitry, which may be implemented by an ASIC or the FPGA circuitry 1200 of FIG. 12 structured to perform operations corresponding to the machine readable instructions. Additionally or alternatively, the camera control circuitry 304 may be instantiated by any other combination of hardware, software, and/or firmware. For example, the camera control circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the camera circuitry 134 of FIG. 1 is illustrated in FIG. 3, one or more of the elements, processes, and/or devices illustrated in FIG. 3 may be combined, divided, re-arranged, omitted, eliminated, and/or implemented in any other way. Further, the example camera abstract circuitry 136, example image sensor virtualization circuitry 302, example camera control circuitry 304, example portrait image sensor driver 306, example landscape image sensor driver 308, example IPU driver 310, and/or, more generally, the example camera circuitry 134 of FIG. 1, may be implemented by hardware alone or by hardware in combination with software and/or firmware. Thus, for example, any of the example camera abstract circuitry 136, example image sensor virtualization circuitry 302, example camera control circuitry 304, example portrait image sensor driver 306, example landscape image sensor driver 308, example IPU driver 310, and/or, more generally, the example camera circuitry 134, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example camera circuitry 134 of FIG. 1 may include one or more elements, processes, and/or devices in addition to, or instead of, those illustrated in FIG. 3, and/or may include more than one of any or all of the illustrated elements, processes and devices.

Figure 4:
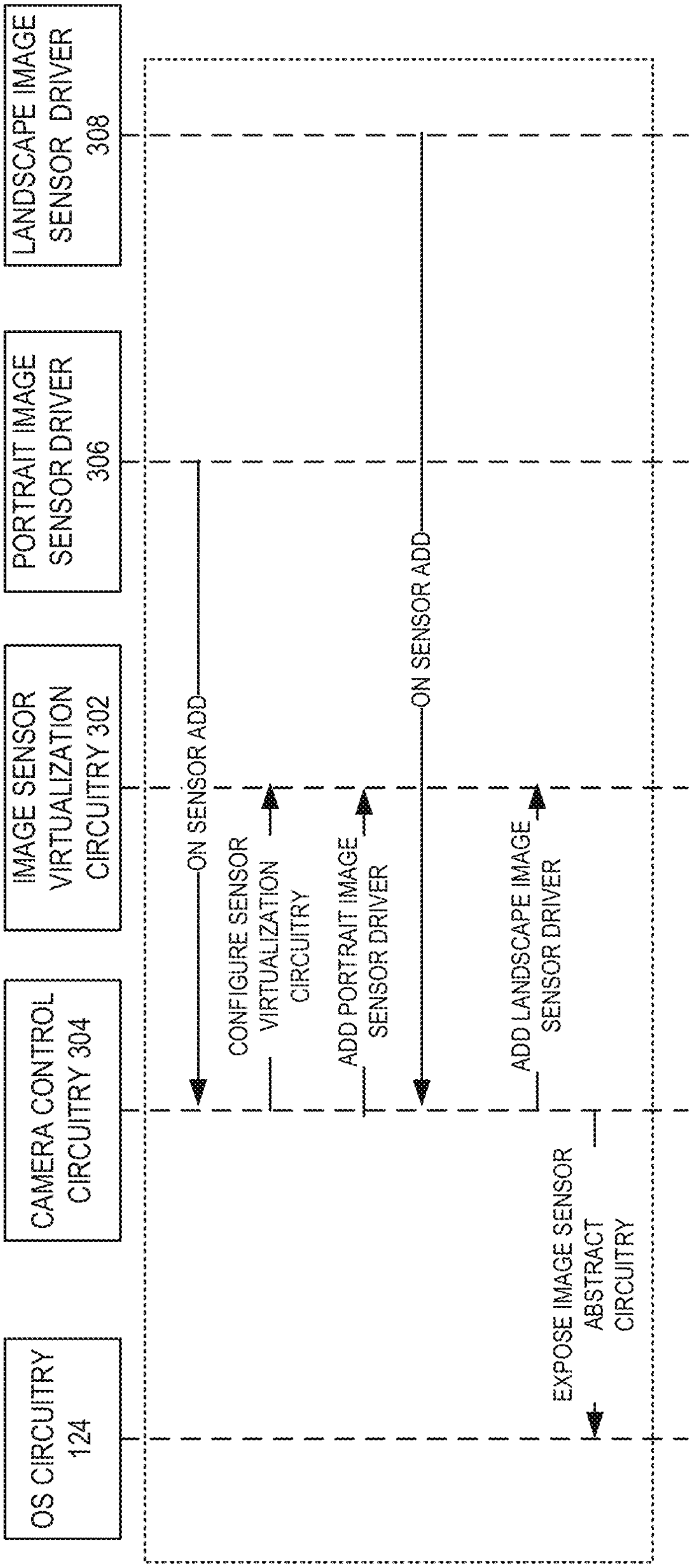
FIG. 4 is a schematic illustration of an example framework to generate a virtual sensor device.

FIG. 4 is a schematic illustration of an example framework to generate (e.g., configure) a virtual sensor device for an electronic device, such as electronic device 102 of FIGS. 1-3. Upon start-up of the electronic device 102, the example image sensor drivers (e.g., portrait image sensor driver 306 and landscape image sensor driver 308) are available for loading from the example OS circuitry 124. Upon detection of the image sensor drivers 306, 308, the example camera control circuitry 304 configures the image sensor virtualization circuitry 302 as an example virtual sensor device by adding the image sensor drivers 306, 308 to the image sensor virtualization circuitry 302. Once the image sensor drivers 306, 308 are loaded to the image sensor virtualization circuitry 302, the camera control circuitry 304 exposes the image sensor virtualization circuitry 302 to the OS circuitry 124 (e.g., and applications that execute on the electronic device 102) as the virtual sensor device.

In the illustrated example of FIG. 4, the portrait image sensor driver 306 is detected by the camera control circuitry 304 first. The camera control circuitry 304 then begins to generate the virtual sensor device by causing the image sensor virtualization circuitry 302 to load the portrait image sensor driver 306. The camera control circuitry 304 then detects the landscape image sensor driver 308 and causes the image sensor virtualization circuitry 302 to load the landscape image sensor driver 308. The camera control circuitry 304 then exposes the image sensor virtualization circuitry 302 to the OS circuitry 124 as the virtual sensor device. The image sensor virtualization circuitry 302 is visible to the OS circuitry 124, applications executing in the user space 126, and the user rather than the image sensor drivers 306, 308.

The image sensor drivers 306, 308 are communicatively coupled to respective image sensors (e.g., image sensors 112, 114). The image sensor virtualization circuitry 302 controls the physical image sensors 112, 114 via the image sensor drivers 306, 308. From application perspective, only the image sensor virtualization circuitry 302 is visible.

Figure 5:
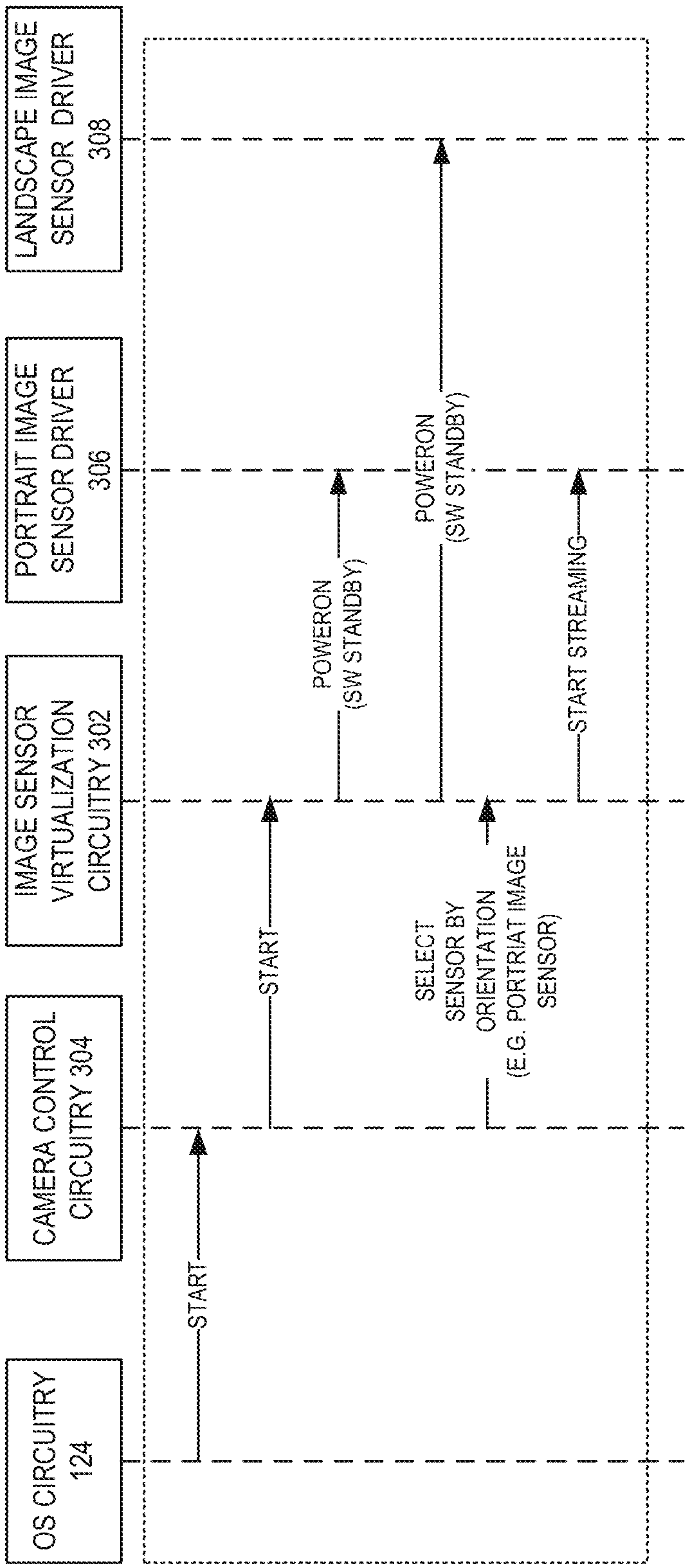
FIG. 5 is a schematic illustration of an example framework to manage multiple image sensors using the virtual sensor device.

FIG. 5 is a schematic illustration of an example framework to manage the image sensors 112, 114 using the image sensor virtualization circuitry 302. The example camera control circuitry 304 controls the image sensor virtualization circuitry 302 and manages interactions with the OS circuitry 124 and/or applications executing in the user space 126. When an application launches, the OS circuitry 124 notifies the camera control circuitry 304 that an image sensor 112, 114 will be utilized. That is, the OS circuitry 124 instructs the camera control circuitry 304 to start streaming image data from the image sensor virtualization circuitry 302 exposed to the OS circuitry 124. In response, the camera control circuitry 304 instructs the image sensor virtualization circuitry 302 to power up the image sensors 112, 114. The image sensor virtualization circuitry 302 powers on the portrait image sensor 112 via the portrait image sensor driver 306 and enters the portrait image sensor 112 into standby mode. The image sensor virtualization circuitry 302 then powers on the landscape image sensor 114 via the landscape image sensor driver 308 and enters the landscape image sensor 114 into standby mode.

To determine which image sensor 112, 114 to place into streaming mode, the camera control circuitry 304 obtains a current orientation of the electronic device 102 by retrieving the orientation from the orientation monitoring circuitry 120. Based on the current orientation of the electronic device 102, the camera control circuitry 304 determines (e.g., selects) which image sensor 112, 114 is associated with the determined orientation. In the illustrated example of FIG. 5, the camera control circuitry 304 selects the portrait image sensor 112. That is, the electronic device 102 in the example of FIG. 5 is in a portrait orientation. The camera control circuitry 304 notifies the image sensor virtualization circuitry 302 of the selection.

The image sensor virtualization circuitry 302 instructs the selected image sensor 112 to begin streaming by entering the image sensor 112 into streaming mode via the corresponding image sensor driver 306. The other image sensor(s) 114 remains in standby mode while the application is executing. In the standby mode, the other image sensor(s) 114 is (are) ready to stream in case of a change in orientation of the electronic device 102. As discussed above, the standby mode and/or the streaming mode of each image sensor 112, 114 can be swapped on the fly, with little to no latency, and within the image sensor virtualization circuitry 302.

Figure 6:
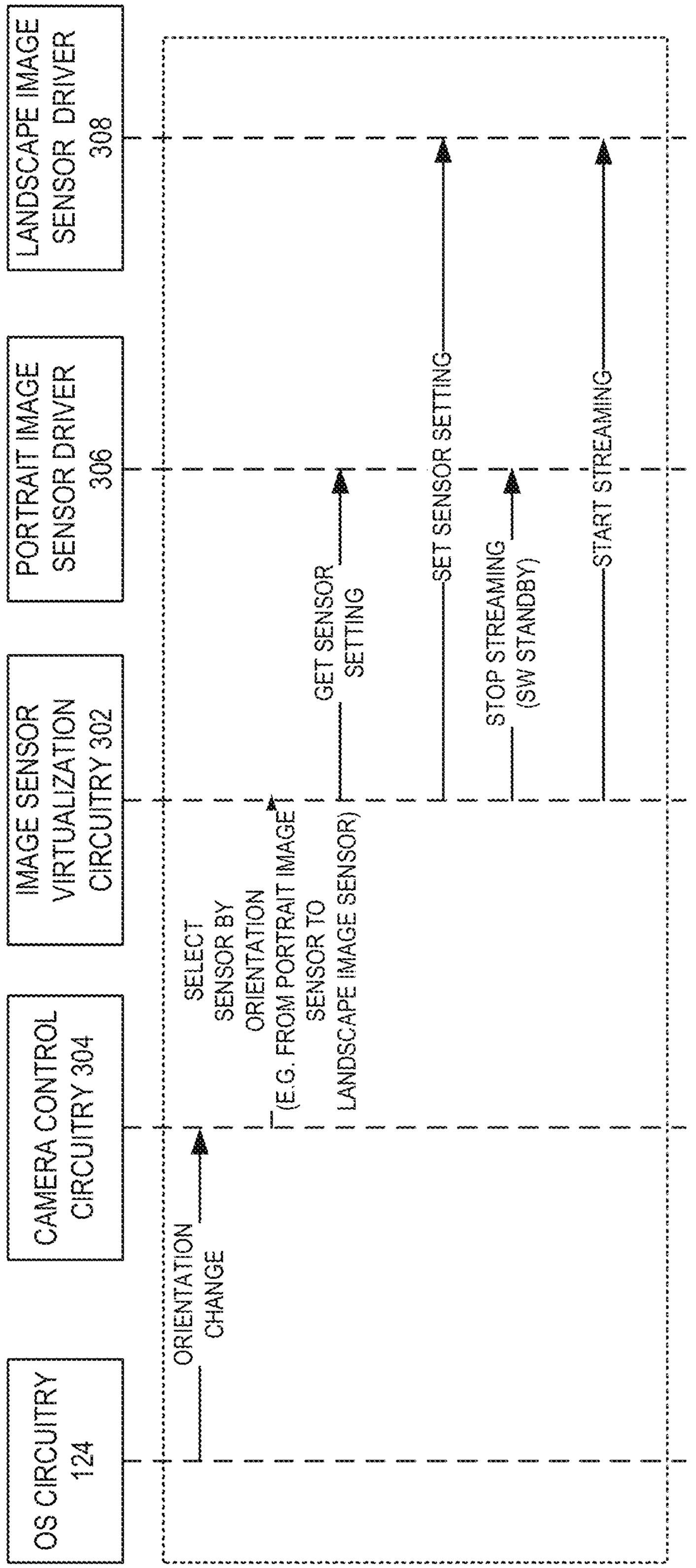
FIG. 6 is schematic illustration of an example framework to respond to a change in an orientation of an electronic device.

FIG. 6 is schematic illustration of an example framework to respond to a change in device orientation. Upon a change in orientation of the electronic device 102 during streaming, the camera control circuitry 304 is notified by the example orientation monitoring circuitry 120 via the OS circuitry 124. Based on the new orientation, the camera control circuitry 304 selects the image sensor 112, 114 associated with the new, detected orientation. In the illustrated example of FIG. 6, the camera control circuitry 304 determines that the landscape image sensor 114 is associated with the new, detected orientation.

The camera control circuitry 304 instructs the image sensor virtualization circuitry 302 to switch the currently streaming image sensor (e.g., by placing the currently streaming image sensor 112 into standby mode and the newly selected image sensor 114 into streaming mode). Before switching, the image sensor virtualization circuitry 302 identifies a current configuration of the current streaming image sensor 112. The image sensor virtualization circuitry 302 then configures the newly selected image sensor 114 to the identified configuration of the current streaming image sensor 112. Once the newly selected image sensor 114 is configured, the image sensor virtualization circuitry 302 instructs the current streaming image sensor 112 to stop streaming and enter standby mode via the corresponding image sensor driver 306. Further, the image sensor virtualization circuitry 302 instructs the newly selected image sensor 114 to enter streaming mode via the corresponding image sensor driver 308. Because the standby mode and streaming mode can be switched on the fly, there will be no frame glitch during such switching.

Figure 7:
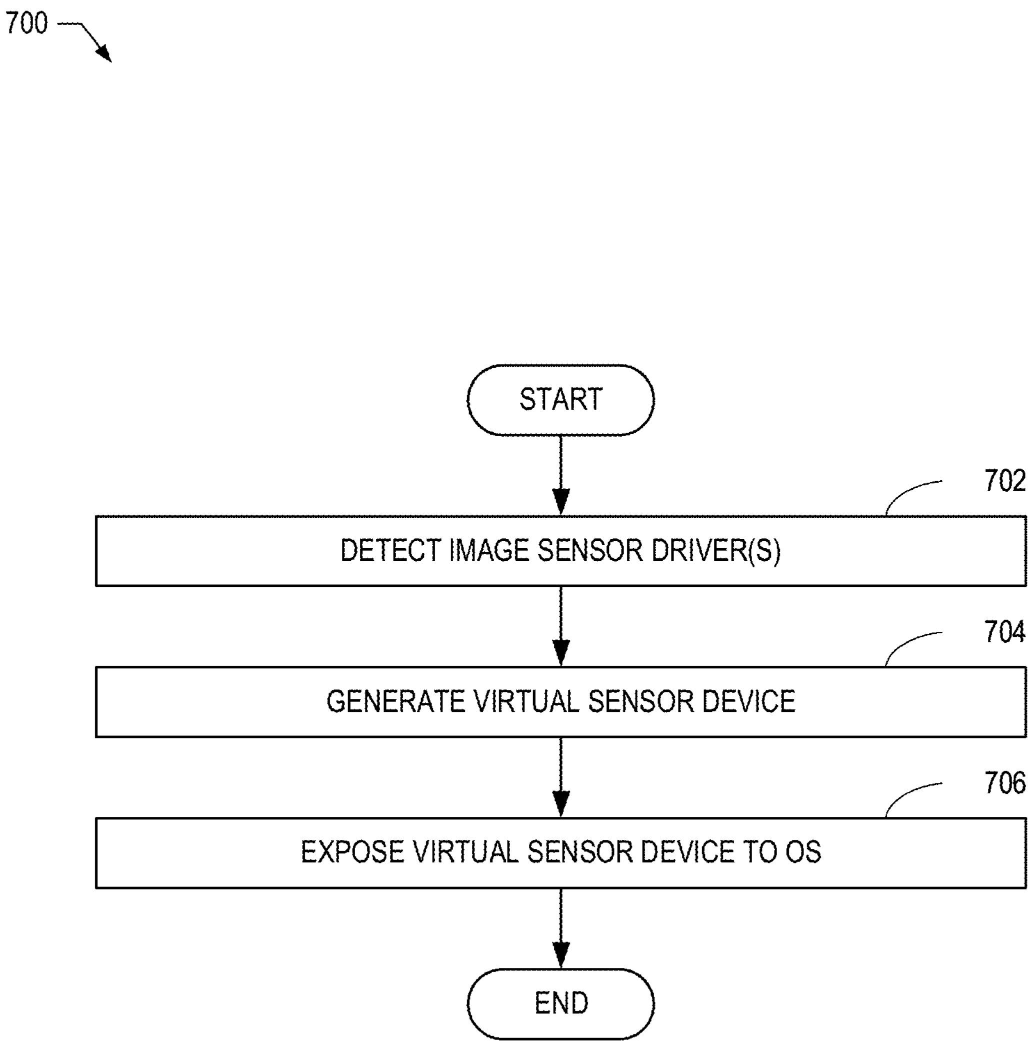
FIGS. 7-9 are flowcharts representative of example machine readable instructions and/or example operations that may be executed by example processor circuitry to implement the example system of FIG. 1, the example camera circuitry of FIG. 3, and/or the example frameworks of FIGS. 4, 5, and 6.
Figure 8:
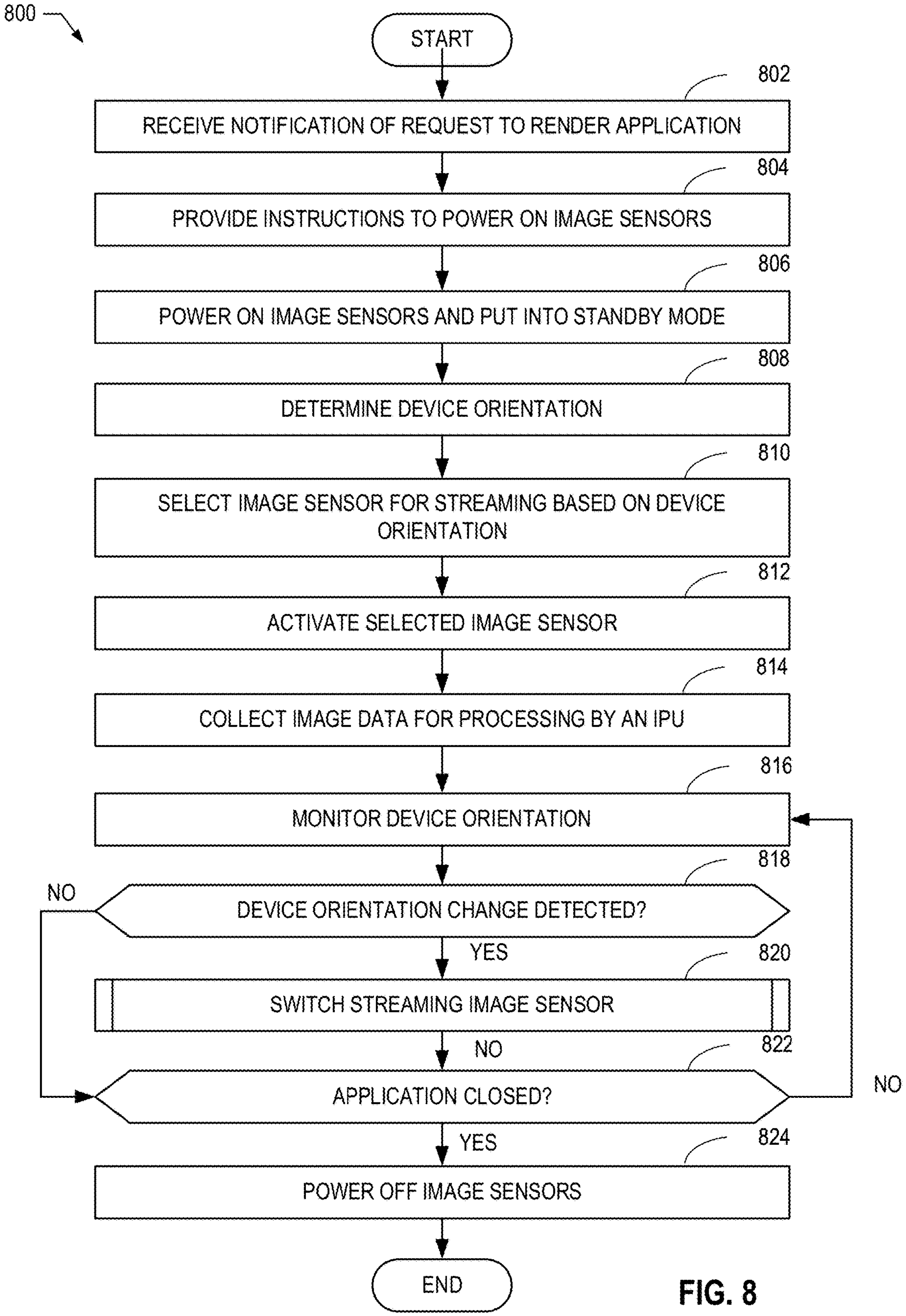
Figure 9:
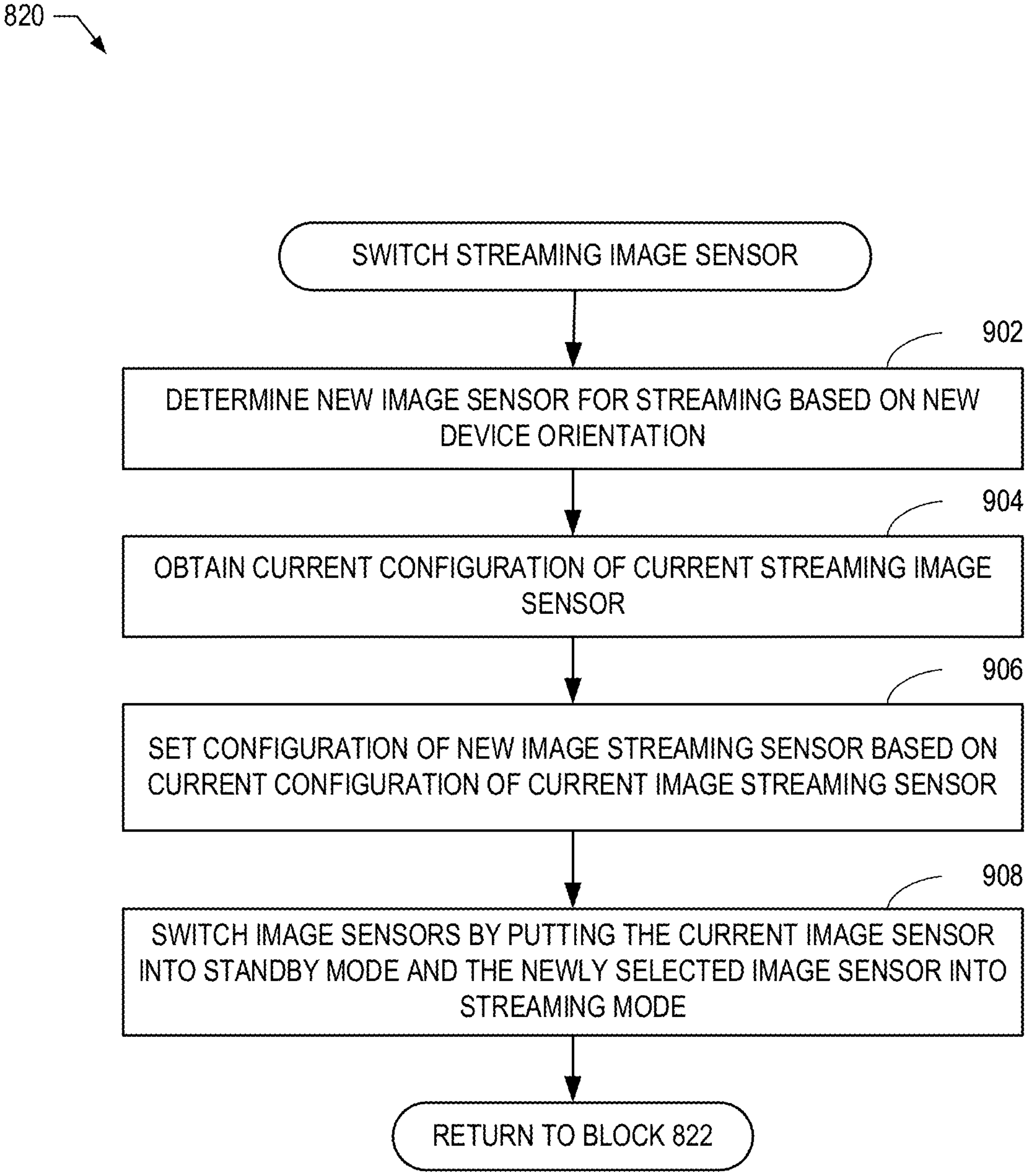

Flowcharts representative of example hardware logic circuitry, machine readable instructions, hardware implemented state machines, and/or any combination thereof for implementing the camera circuitry 134 of FIGS. 1 and 3 and/or the example frameworks of FIGS. 4, 5, and 6 are shown in FIGS. 7-9. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 7-9, many other methods of implementing the example camera circuitry 134 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7-9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to generate an example virtual sensor device. The machine readable instructions and/or the operations 700 of FIG. 7 begin at block 702, at which example camera control circuitry (e.g., camera control circuitry 304) detects two or more image sensor drivers (e.g., image sensor drivers 306, 308) available for loading from example OS circuitry (e.g., OS circuitry 124). For example, the camera control circuitry 304 may detect the image sensor drivers 306, 308 upon start-up of the electronic device 102. The camera control circuitry 304 may detect the portrait image sensor driver 306 corresponding to a portrait image sensor (e.g., portrait image sensor 112) and the landscape image sensor driver 308 corresponding to a landscape image sensor (e.g., landscape image sensor 114).

Upon detection of the image sensor drivers 306, 308, the camera control circuitry 304 generates a virtual sensor device at block 704 by configuring example image sensor virtualization circuitry (e.g., image sensor virtualization circuitry 302) as the virtual sensor device. The camera control circuitry 304 configures the image sensor virtualization circuitry 302 as the virtual sensor device by adding the image sensor drivers 306, 308 to the image sensor virtualization circuitry 302. To do so, the camera control circuitry 304 causes the image sensor virtualization circuitry 302 to load the image sensor drivers 306, 308 from the OS circuitry 124. For example, the camera control circuitry 304 instructs the image sensor virtualization circuitry 302 load the portrait image sensor driver 306 and the landscape image sensor driver 308 from the OS circuitry 124. In doing so, the camera control circuitry 304 causes the image sensor virtualization circuitry 302 to encapsulate the image sensor drivers 306, 308 into one logical virtual sensor device (e.g., the image sensor virtualization circuitry 302). The image sensor virtualization circuitry 302 manages and controls the image sensors 112, 114 via the respective image sensor drivers 306, 308. The actual image sensors 112, 114 remain undetected by other components of the electronic device 102.

At block 706, the camera control circuitry 304 exposes the image sensor virtualization circuitry 302 to the OS circuitry 124 as the virtual sensor device. For example, the camera control circuitry 304 reveals the image sensor virtualization circuitry 302 to the OS circuitry 124 for utilization by applications that execute in example user space (e.g., user space 126) of the OS circuitry 124.

FIG. 8 is a flowchart representative of example machine readable instructions and/or example operations 800 that may be executed and/or instantiated by processor circuitry to facilitate use of an image sensor 112, 114 by OS Circuitry 124 to execute an application. The machine readable instructions and/or the operations 800 of FIG. 8 begin at block 802, at which the example camera control circuitry 304 receives a notification of a request to render an application the utilizes a camera. For example, the camera control circuitry 304 may receive a notification from example kernel circuitry (e.g., kernel circuitry 130) that the kernel circuitry 130 received a system call to launch the application via example system call interface circuitry (e.g., system call interface circuitry 132).

At block 804, the camera control circuitry 304 instructs the image sensor virtualization circuitry 302 to power on the image sensors 112, 114. For example, the camera control circuitry 304 may instruct the image sensor virtualization circuitry 302 to power on the portrait image sensor 112 and the landscape image sensor 114. At block 806, the image sensor virtualization circuitry 302 powers on the image sensors 112, 114 and places the image sensors 112, 114 into standby mode. The image sensor virtualization circuitry 302 powers on the image sensors 112, 114 via respective image sensor drivers 306, 308, which are communicatively coupled to the image sensors 112, 114.

At block 808, the camera control circuitry 304 determines an orientation of the electronic device 102. For example, the camera control circuitry 304 may determine whether the electronic device 102 is in a portrait orientation or a landscape orientation. The camera control circuitry 304 requests the current orientation of the electronic device 102 from example orientation monitoring circuitry (e.g., orientation monitoring circuitry 120), which is communicatively coupled to an example device orientation sensor (e.g., device orientation sensor 118).

At block 810, the camera control circuitry 304 selects an image sensor 112, 114 for streaming based on the current device orientation. For example, the camera control circuitry 304 may select the portrait image sensor 112 if the current device orientation is the portrait orientation as the portrait image sensor 112 is positioned at a top edge of the electronic device 102 in the portrait orientation. If the current device orientation is the landscape orientation, the camera control circuitry 304 selects the landscape image sensor 114 because the landscape image sensor 114 is positioned at a top edge of the electronic device 102 in the landscape orientation.

At block 812, the image sensor virtualization circuitry 302 activates the selected image sensor 112, 114 by placing the selected image sensor 112, 114 into streaming mode via the corresponding image sensor driver 306, 308. For example, the image sensor virtualization circuitry 302 activates the portrait image sensor 112 if the camera control circuitry 304 determines the electronic device 102 is in the portrait orientation. In such an example, the landscape image sensor 114 remains in standby mode. If the landscape image sensor 114 is selected and placed into streaming mode, the portrait image sensor 112 remains in standby mode. At block 814, the streaming image sensor 112, 114 collects image data, which is to be processed by an example IPU (e.g., IPU 116). For example, image data is captured by the streaming image sensor 112, 114, which is directed to an example IPU driver (e.g., IPU driver 310) by the camera control circuitry 304. The IPU driver 310 instructs the IPU 116 to process the image data.

At block 816, the camera control circuitry 304 monitors an orientation of the electronic device to respond to a change in orientation. In some examples, the camera control circuitry 304 monitors a device orientation sensor (e.g., device orientation sensor 118) and/or the orientation monitoring circuitry 120. In some examples, the camera control circuitry 304 awaits a notification of a change in orientation received by the orientation monitoring circuitry 120. At block 818, the camera control circuitry 304 determines whether a device orientation change is detected. If the answer is YES, and an orientation of the electronic device 102 has changed, control advances to block 820. At block 820, the streaming sensor is switched (e.g., the currently streaming image sensor is deactivated while a newly selected image sensor is activated).

If the electronic device 102 has not changed orientation (e.g., the answer to block 818 is NO), control advances to block 822 at which the camera circuitry 134 determines whether the application has been closed. For example, a user may have closed the application and/or shut down camera function. If the application has not been closed (e.g., the answer to block 822 is NO), control advances back to block 816 at which the camera control circuitry 304 continues to monitor the device orientation. If the answer to block 822 is YES and the application has been closed, the image sensor virtualization circuitry 302 is notified and powers off the image sensor 112, 114 via the image sensor drivers 306, 308 (block 824).

FIG. 9 is a flowchart representative of example machine readable instructions and/or example operations 820 that may be executed and/or instantiated by processor circuitry to switch a streaming image sensor 112, 114 in response to the change in orientation of the electronic device 102. The machine readable instructions and/or the operations 820 of FIG. 9 begin at block 902, at which the camera control circuitry 304 selects a new image sensor for streaming based on the new device orientation. For example, the camera control circuitry 304 receives and/or retrieves the new device orientation from the orientation monitoring circuitry 120. Based on the new device orientation, the camera control circuitry 304 selects the image sensor 112, 114 associated with the new orientation. For example, the camera control circuitry 304 may select the landscape image sensor 114 if the new orientation is the landscape orientation.

At block 904, the image sensor virtualization circuitry 302 obtains a current configuration of the current streaming image sensor 112, 114. For example, the configuration may include an exposure, analog gain, digital gain parameters, etc. of the currently streaming image sensor 112, 114. At block 906, the image sensor virtualization circuitry 302 sets a configuration of the newly selected image sensor 112, 114. For example, the current streaming sensor may be the portrait image sensor 112 and the newly select image sensor for streaming may be the landscape image sensor 114. The image sensor virtualization circuitry 302 obtains a current configuration of the portrait image sensor and sets a configuration of the landscape image sensor 114 based the obtained configuration of the portrait image sensor 114. The image sensor virtualization circuitry 302 obtains a configuration of and/or configures the image sensors 112, 114 via respective image sensor drivers 306, 308.

At block 908, the image sensor virtualization circuitry 302 switches the streaming image sensor by putting the current streaming image sensor 112, 114 into standby mode (e.g., deactivating the current streaming sensor) and putting the newly selected image sensor 112, 114 into streaming mode (e.g., activating the newly selected image sensor). If the current streaming image sensor is the portrait image sensor, for example, the image sensor virtualization circuitry 302 places the portrait image sensor 112 into standby mode and the landscape image sensor 114 into streaming mode. The portrait image sensor 112 stays in standby mode in the event the orientation of the electronic device changes back. Control then advances back to block 822 of FIG. 8.

Figure 10:
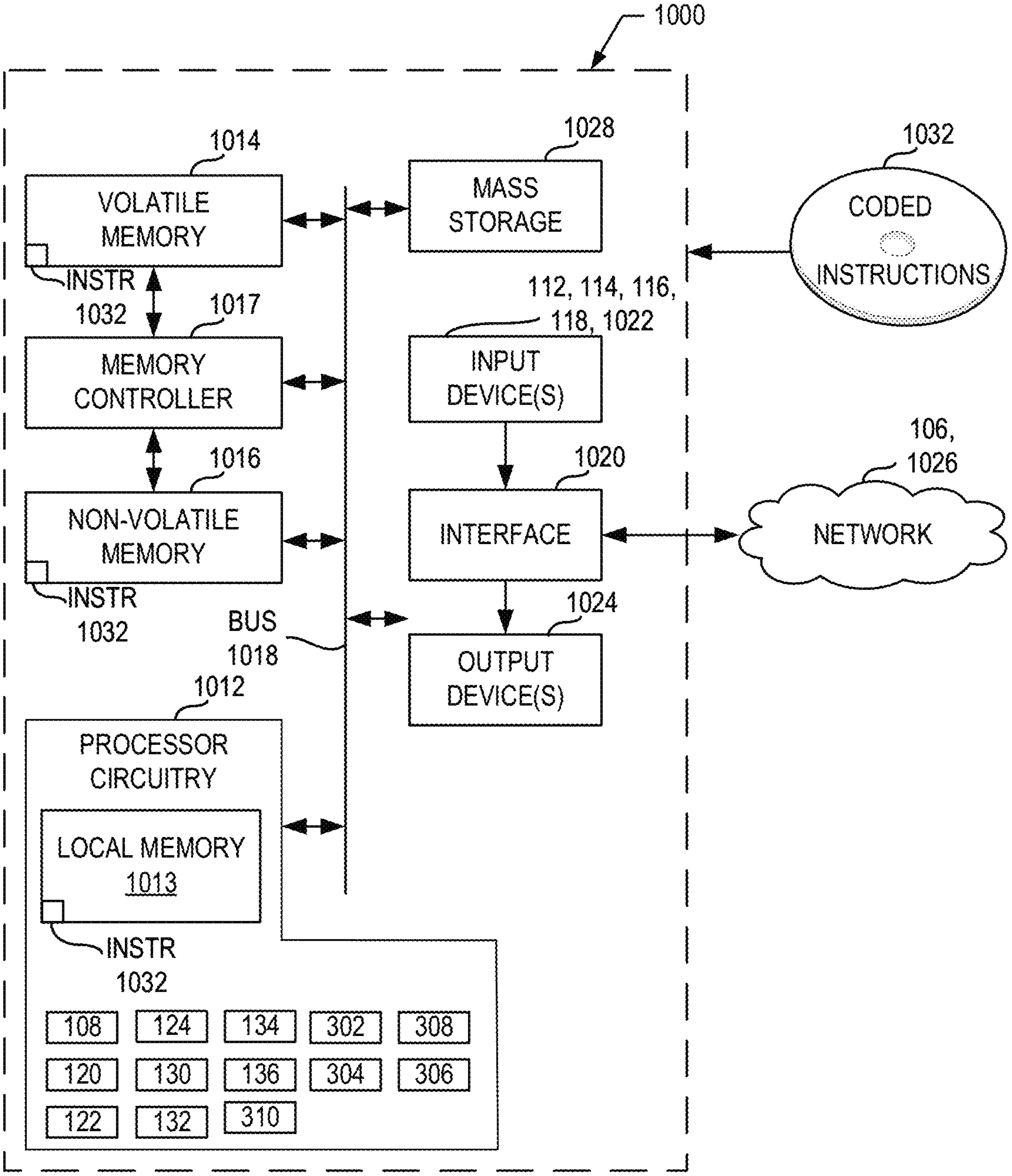
FIG. 10 is a block diagram of an example processing platform including processor circuitry structured to execute the example machine readable instructions and/or the example operations of FIGS. 7-9 to implement the example system of FIG. 1, the example camera virtualization circuitry of FIG. 3, and/or the example frameworks of FIGS. 4, 5, and 6.

FIG. 10 is a block diagram of an example processor platform 1000 structured to execute and/or instantiate the machine readable instructions and/or the operations of FIGS. 7-9 to implement the camera circuitry 134 of FIGS. 1, 3, and/or 4-6. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a digital video recorder, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements processor circuitry 108, orientation monitoring circuitry 120, user interface circuitry 122, operating system circuitry 124, kernel circuitry 130, system call interface circuitry 142, camera circuitry 134, camera virtualization circuitry 136, camera control circuitry 304, image sensor virtualization circuitry 302, portrait image sensor driver 306, landscape image sensor driver 308, and IPU driver 310.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1032, which may be implemented by the machine readable instructions of FIGS. 7-9, may be stored in the mass storage device 1028, in the volatile memory 1014, in the non-volatile memory 1016, and/or on a removable non-transitory computer readable storage medium such as a CD or DVD.

Figure 11:
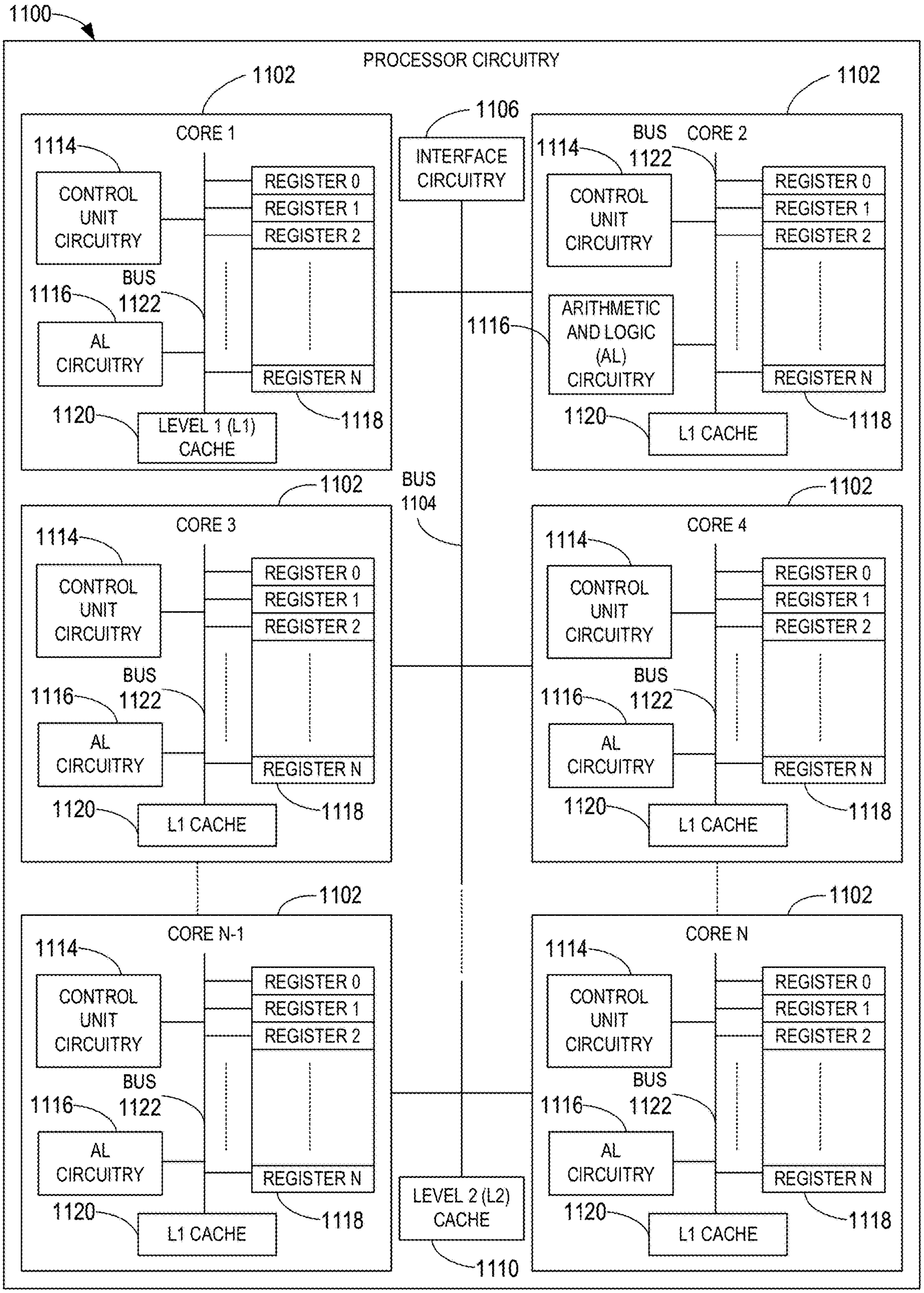
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a general purpose microprocessor 1100. The general purpose microprocessor circuitry 1100 executes some or all of the machine readable instructions of the flowcharts of FIGS. 7-9 to effectively instantiate the camera circuitry 134 of FIG. 3 as logic circuits to perform the operations corresponding to those machine readable instructions. In some such examples, the circuitry of FIG. 3] is instantiated by the hardware circuits of the microprocessor 1100 in combination with the instructions. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 7-9.

The cores 1102 may communicate by a first example bus 1104. In some examples, the first bus 1104 may implement a communication bus to effectuate communication associated with one(s) of the cores 1102. For example, the first bus 1104 may implement at least one of an Inter-Integrated Circuit (I2C) bus, a Serial Peripheral Interface (SPI) bus, a PCI bus, or a PCIe bus. Additionally or alternatively, the first bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register (s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The second bus 1122 may implement at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
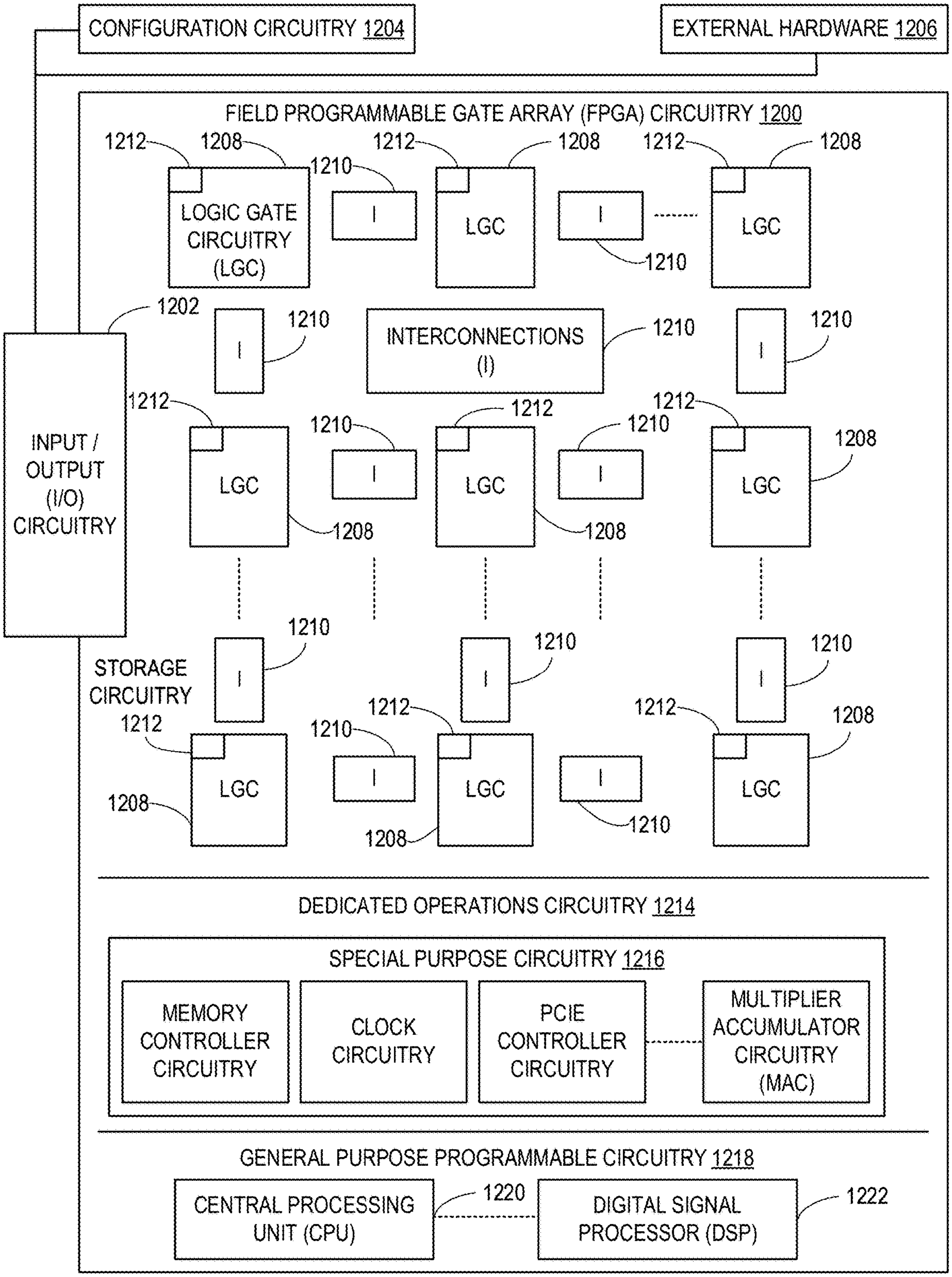
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 7-9 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 7-9. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 7-9. As such, the FPGA circuitry 1200 may be structured to effectively instantiate some or all of the machine readable instructions of the flowcharts of FIGS. 7-9 as dedicated logic circuits to perform the operations corresponding to those software instructions in a dedicated manner analogous to an ASIC. Therefore, the FPGA circuitry 1200 may perform the operations corresponding to the some or all of the machine readable instructions of 1032 FIG. 10 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of 1032 FIG. 10 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 7-9 may be executed by one or more of the cores 1102 of FIG. 11, a second portion of the machine readable instructions represented by the flowcharts of FIGS. 7-9 may be executed by the FPGA circuitry 1200 of FIG. 12, and/or a third portion of the machine readable instructions represented by the flowcharts of FIGS. 7-9 may be executed by an ASIC. It should be understood that some or all of the circuitry of FIGS. 1, 3, and/or 4-6 may, thus, be instantiated at the same or different times. Some or all of the circuitry may be instantiated, for example, in one or more threads executing concurrently and/or in series. Moreover, in some examples, some or all of the circuitry of FIGS. 1, 3, and/or 4-6 may be implemented within one or more virtual machines and/or containers executing on the microprocessor.

In some examples, the processor circuitry 1012 of FIG. 10 may be in one or more packages. For example, the processor circuitry 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

Figure 13:
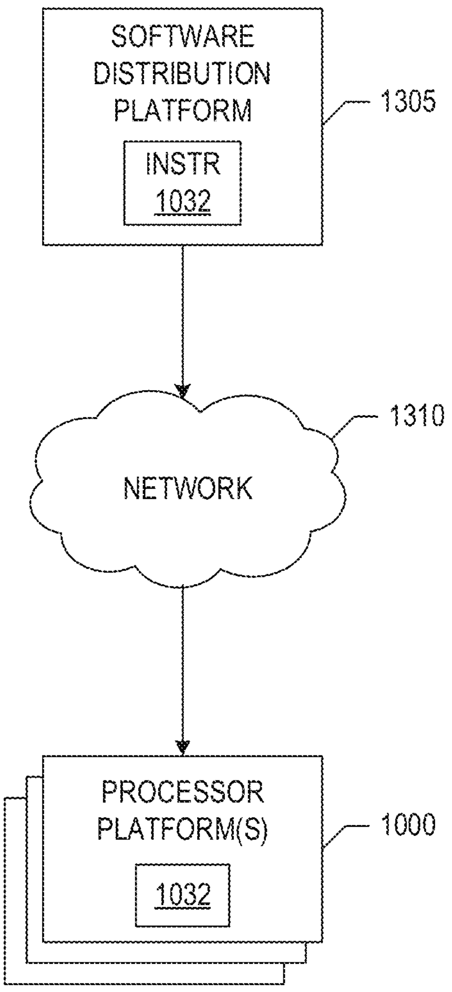
FIG. 13 is a block diagram of an example software distribution platform (e.g., one or more servers) to distribute software (e.g., software corresponding to the example machine readable instructions of FIGS. 7-9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 1032 of FIG. 10 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 10. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 1032, which may correspond to the example machine readable instructions 700, 800, 820 of FIGS. 7-9, as described above. The one or more servers of the example software distribution platform 1305 are in communication with a network 1310, which may correspond to any one or more of the Internet and/or any of the example networks 106, 1026 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1032 from the software distribution platform 1305. For example, the software, which may correspond to the example machine readable instructions 700, 800, 820 of FIGS. 7-9, may be downloaded to the example processor platform 1000, which is to execute the machine readable instructions 1032 to implement the camera circuitry 134. In some example, one or more servers of the software distribution platform 1305 periodically offer, transmit, and/or force updates to the software (e.g., the example machine readable instructions 1032 of FIG. 10) to ensure improvements, patches, updates, etc., are distributed and applied to the software at the end user devices.

From the foregoing, it will be appreciated that example systems, methods, apparatus, and articles of manufacture have been disclosed that encapsulate two or more front-facing image sensors into one logic device. Disclosed systems, methods, apparatus, and articles of manufacture can select and switch between the image sensors automatically and with little to no delay to the user. Disclosed systems, methods, apparatus, and articles of manufacture improve the efficiency of using a computing device by selecting among available image sensors for image capture and/or steaming applications in a manner that is transparent to an operating system, application, and/or the user. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for image sensor selection for electronic user devices are disclosed herein. Further examples and combinations thereof include the following:

Example 1 include an electronic device comprising a device orientation sensor, a first image sensor, a second image sensor, and processor circuitry to execute instructions to determine a detected orientation of the electronic device based on data from the device orientation sensor, select one of the first image sensor or the second image sensor based on the detected orientation of the electronic device, the first image sensor associated with a first orientation of the electronic device, the second image sensor associated with a second orientation of the electronic device, and activate the selected one of the first image sensor or the second image sensor to collect image data.

Example 2 includes the electronic device of example 1, wherein the processor circuitry is further to generate a virtual sensor device, the virtual sensor device to encapsulate and control the first image sensor and the second image sensor, the virtual sensor device to be exposed to components of the electronic device.

Example 3 includes the electronic device of example 1, wherein, in response launching an application that utilizes an image sensor, the processor circuitry executes the instructions to enter the first streaming sensor and the second streaming sensor into a standby mode.

Example 4 includes the electronic device of example 3, wherein the processor circuitry activates the selected one of the first image sensor or the second image sensor by entering the selected one of the first image sensor or the second image sensor into a streaming mode, and wherein the other one of the first image sensor or the second image sensor remains in a standby mode.

Example 5 includes the electronic device of example 1, wherein the detected orientation corresponds to the first orientation, the selected one of the first image sensor or the second image sensor is the first image sensor, and the processor circuitry is to detect a change in orientation of the electronic device to the second orientation, select the second image sensor in response to the change to the second orientation, place the first image sensor into standby mode in response to the change to the second orientation, and activate the second image sensor to collect image data in response to the change to the second orientation.

Example 6 includes the electronic device of example 1, wherein the first orientation corresponds to a portrait orientation of the electronic device, and the first image sensor is positioned in a vicinity of a first edge of the electronic device that corresponds to a horizontal edge of the electronic device when the electronic device is in the portrait orientation.

Example 7 includes the electronic device of example 6, wherein the processor circuitry is to select the first image sensor in response to the detected orientation of the electronic device corresponding to the portrait orientation.

Example 8 includes the electronic device of example 1, wherein the second orientation corresponds to a landscape orientation of the electronic device, and the second image sensor is positioned in a vicinity of a second edge of the electronic device that corresponds to a horizontal edge of the electronic device when the electronic device is in the landscape orientation.

Example 9 includes the electronic device of example 8, wherein the processor circuitry is to select the second image sensor in response to the detected orientation of the electronic device corresponding to the landscape orientation.

Example 10 includes at least one non-transitory computer readable storage medium comprising instructions that, when executed, cause processor circuitry to at least identify a detected orientation of an electronic device based on data generated by a device orientation sensor, select one of a first image sensor or a second image sensor based on the detected orientation of the electronic device, the first image sensor positioned to support a first orientation of the electronic device, the second image sensor positioned to support a second orientation of the electronic device, and activate the selected one of the first image sensor or the second image sensor to capture image data.

Example 11 includes the at least one non-transitory computer readable storage medium of example 10, wherein the instructions, when executed, further cause the processor circuitry to generate a virtual sensor device, the virtual sensor device to encapsulate and control the first image sensor and the second image sensor, the virtual sensor device to be visible to components of the electronic device.

Example 12 includes the at least one non-transitory computer readable storage medium of example 10, wherein the instructions, when executed, cause the processor circuitry to enter the first image sensor and the second image sensor into a standby mode in response launching an application that utilizes an image sensor.

Example 13 includes the at least one non-transitory computer readable storage medium of example 12, wherein activating the selected one of the first image sensor or the second image sensor includes entering the selected one of the first image sensor or the second image sensor into a streaming mode, and wherein the unselected one of the first image sensor or the second image sensor remains in a standby mode.

Example 14 includes the at least one non-transitory computer readable storage medium of example 10, wherein the detected orientation corresponds to the first orientation, the selected one of the first image sensor or the second image sensor is the first image sensor, and the instructions, when executed, cause the processor circuitry to detect a change in orientation of the electronic device to the second orientation, select the second image sensor in response to the change to the second orientation, place the first image sensor into standby mode in response to the change to the second orientation, and activate the second image sensor to capture image data in response to the change to the second orientation.

Example 15 includes the at least one non-transitory computer readable storage medium of example 10, wherein the first orientation corresponds to a portrait orientation of the electronic device, and the first image sensor is positioned in a proximity of a first edge of the electronic device that corresponds to a horizontal edge of the electronic device when the electronic device is in the portrait orientation.

Example 16 includes the at least one non-transitory computer readable storage medium of example 15, wherein the instructions, when executed, cause the processor circuitry to select the first image sensor in response to the detected orientation of the electronic device corresponding to the portrait orientation.

Example 17 includes the at least one non-transitory computer readable storage medium of example 10, wherein the second orientation corresponds to a landscape orientation of the electronic device, and the second image sensor is positioned in a vicinity of a second edge of the electronic device that corresponds to a horizontal edge of the electronic device when the electronic device is in the landscape orientation.

Example 18 includes the at least one non-transitory computer readable storage medium of example 17, wherein the instructions, when executed, cause the processor circuitry to select the second image sensor in response to the detected orientation of the electronic device corresponding to the landscape orientation.

Example 19 includes a method comprising determining a detected rotation position of an electronic device based on data from a device orientation sensor, the detected rotation position to be a first rotation position, selecting a first image sensor of a plurality of image sensors based on the detected rotation position of the electronic device, the first image sensor corresponding to the first rotation position of the electronic device, and causing the first image sensor to collect image data.

Example 20 includes the method of example 19, further including generating a virtual sensor device, the virtual sensor device to encapsulate and control the plurality of image sensors, the virtual sensor device to be exposed to components of the electronic device.

Example 21 includes the method of example 19, further including entering the plurality of image sensors into standby mode in response to launching an application that uses a camera.

Example 22 includes the method of example 21, wherein causing the first image sensor to collect image data includes entering the first image sensor into streaming mode, and wherein other ones of the plurality of image sensors remain in standby mode.

Example 23 includes the method of example 19, wherein the first rotation position corresponds to a portrait orientation of the electronic device, and the first image sensor of the plurality of image sensors is positioned in a vicinity of a first edge of the electronic device that corresponds to a horizontal edge of the electronic device when the electronic device is in the portrait orientation.

Example 24 includes the method of example 19, further including detecting a change in the rotation position of the electronic device to a second rotation position, selecting a second image sensor of the plurality of image sensors in response to the change to the second rotation position, the second image sensor corresponding to the second rotation position of the electronic device, causing the first image sensor to enter standby mode in response to the change to the second rotation position, and causing the second image sensor to collect image data in response to the change to the second rotation position.

Example 25 includes the method of example 24, wherein the second rotation position corresponds to a landscape orientation of the electronic device, and the second image sensor of the plurality of image sensors is positioned in a vicinity of a second edge of the electronic device that corresponds to a horizontal edge of the electronic device when the electronic device is in the landscape orientation.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An electronic device comprising:

a device orientation sensor;

a first image sensor;

a second image sensor;

machine readable instructions; and at least one processor circuit to be programmed based on the machine readable instructions to:

cause the first image sensor and the second image sensor to switch to a standby mode responsive to initiation of an application, the first image sensor associated with a first orientation of the electronic device, the second image sensor associated with a second orientation of the electronic device, the second orientation different from the first orientation;

select one of the first image sensor or the second image sensor based on a detected orientation of the electronic device; and cause the selected one of the first image sensor or the second image sensor to switch to a streaming mode to collect image data, an unselected one of the first image sensor or the second image sensor to remain in the standby mode.

2. The electronic device of claim 1, wherein one or more of the at least one processor circuit is to:

implement a virtual sensor device, the virtual sensor device to encapsulate and control the first image sensor and the second image sensor; and cause the virtual sensor device to be exposed to one or more components of the electronic device.

3. The electronic device of claim 1, wherein the detected orientation corresponds to the first orientation, the selected one of the first image sensor or the second image sensor is the first image sensor, and one or more of the at least one processor circuit is to:

detect a change in orientation of the electronic device to the second orientation;

select the second image sensor after the change to the second orientation;

cause the first image sensor to switch to the standby mode after the change to the second orientation; and cause the second image sensor to switch to the streaming mode to collect image data after the change to the second orientation.

4. The electronic device of claim 1, wherein the first orientation corresponds to a portrait orientation of the electronic device, and the first image sensor is positioned adjacent to a first edge of the electronic device that corresponds to a horizontal edge of the electronic device when the electronic device is in the portrait orientation.

5. The electronic device of claim 4, wherein one or more of the at least one processor circuit is to select the first image sensor based on the detected orientation of the electronic device corresponding to the portrait orientation.

6. The electronic device of claim 1, wherein the second orientation corresponds to a landscape orientation of the electronic device, and the second image sensor is positioned adjacent to a second edge of the electronic device that corresponds to a horizontal edge of the electronic device when the electronic device is in the landscape orientation.

7. The electronic device of claim 6, wherein one or more of the at least one processor circuit is to select the second image sensor based on the detected orientation of the electronic device corresponding to the landscape orientation.

8. At least one non-transitory computer readable storage medium comprising machine-readable instructions to cause at least one processor circuit to at least:

cause a first image sensor and a second image sensor to transition to a standby mode responsive to initiation of an application, the first image sensor to support a first orientation of an electronic device, the second image sensor to support a second orientation of the electronic device, the second orientation different from the first orientation;

select one of the first image sensor or the second image sensor based on a detected orientation of the electronic device; and cause the selected one of the first image sensor or the second image sensor to transition to a streaming mode to capture image data, an unselected one of the first image sensor or the second image sensor to remain in the standby mode.

9. The at least one non-transitory computer readable storage medium of claim 8, wherein the machine-readable instructions are to cause one or more of the at least one processor circuit to;

implement a virtual sensor device, the virtual sensor device to encapsulate and control the first image sensor and the second image sensor; and cause the virtual sensor device to be visible to one or more components of the electronic device.

10. The at least one non-transitory computer readable storage medium of claim 8, wherein the detected orientation corresponds to the first orientation, the selected one of the first image sensor or the second image sensor is the first image sensor, and the machine-readable instructions are to cause one or more of the at least one processor circuit to:

detect a change in orientation of the electronic device to the second orientation;

select the second image sensor after the change to the second orientation;

cause the first image sensor to switch to the standby mode after the change to the second orientation; and cause the second image sensor to switch to the streaming mode to capture image data after the change to the second orientation.

11. The at least one non-transitory computer readable storage medium of claim 8, wherein the first orientation corresponds to a portrait orientation of the electronic device, and the first image sensor is positioned proximate to a first edge of the electronic device that corresponds to a horizontal edge of the electronic device when the electronic device is in the portrait orientation.

12. The at least one non-transitory computer readable storage medium of claim 11, wherein the machine-readable instructions are to cause one or more of the at least one processor circuit to select the first image sensor based on the detected orientation of the electronic device corresponding to the portrait orientation.

13. The at least one non-transitory computer readable storage medium of claim 8, wherein the second orientation corresponds to a landscape orientation of the electronic device, and the second image sensor is positioned proximate to a second edge of the electronic device that corresponds to a horizontal edge of the electronic device when the electronic device is in the landscape orientation.

14. The at least one non-transitory computer readable storage medium of claim 13, wherein the machine-readable instructions are to cause one or more of the at least one processor circuit to select the second image sensor based on the detected orientation of the electronic device corresponding to the landscape orientation.

15. A method comprising:

switching a plurality of image sensors to a standby mode responsive to initiation of an application, a first image sensor of the plurality of image sensors to support a first rotation position of an electronic device, a second image sensor of the plurality of image sensors to support a second rotation position of the electronic device, the second rotation position different from the first rotation position;

selecting the first image sensor based on a detected rotation position of the electronic device corresponding to the first rotation position; and switching the first image sensor to a streaming mode to cause the first image sensor to collect image data, the second image sensor to remain in the standby mode.

16. The method of claim 15, including:

detecting a rotation position change of the electronic device to the second rotation position;

selecting the second image sensor after the rotation position change to the second rotation position;

switching the first image sensor to the standby mode after the rotation position change to the second rotation position; and switching the second image sensor to the streaming mode to cause the second image sensor to collect image data after the rotation position change to the second rotation position.

17. The electronic device of claim 2, wherein one or more of the at least one processor circuit is to cause the virtual sensor device to be exposed to an operating system of the electronic device, and the virtual sensor device is to appear as a single logical device to the operating system.

18. The at least one non-transitory computer readable storage medium of claim 9, wherein the machine-readable instructions are to cause one or more of the at least one processor circuit to expose the virtual sensor device to an operating system of the electronic device, and the virtual sensor device is to appear as a single logical device to the operating system.

19. The method of claim 15, including:

implementing a virtual sensor device, the virtual sensor device to encapsulate and control the first image sensor and the second image sensor; and exposing the virtual sensor device to one or more components of the electronic device.

20. The method of claim 19, wherein the exposing of the virtual sensor device includes exposing the virtual sensor device to an operating system of the electronic device, and the virtual sensor device is to appear as a single logical device to the operating system.

* * * * *